(12) United States Patent
Yamamoto et al.

(10) Patent No.: US 10,651,658 B2
(45) Date of Patent: May 12, 2020

(54) FOREIGN OBJECT DETECTING DEVICE, WIRELESS POWER TRANSMITTING APPARATUS, AND WIRELESS POWER TRANSFER SYSTEM

(71) Applicant: Panasonic Intellectual Property Management Co., Ltd., Osaka (JP)

(72) Inventors: Atsushi Yamamoto, Kyoto (JP); Hiroshi Kanno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 523 days.

(21) Appl. No.: 15/067,174

(22) Filed: Mar. 11, 2016

(65) Prior Publication Data

US 2016/0336760 A1  Nov. 17, 2016

(30) Foreign Application Priority Data

May 15, 2015 (JP) .................................. 2015-100050

(51) Int. Cl.
*H02J 50/12* (2016.01)
*H02J 5/00* (2016.01)
(Continued)

(52) U.S. Cl.
CPC .............. *H02J 5/005* (2013.01); *G01V 3/101* (2013.01); *H02J 50/10* (2016.02); *H02J 50/12* (2016.02); *H02J 50/40* (2016.02); *H02J 50/60* (2016.02)

(58) Field of Classification Search
CPC .......... G01V 3/101; H02J 5/005; H02J 50/10; H02J 50/12; H02J 50/40; H02J 50/60
(Continued)

(56) References Cited

U.S. PATENT DOCUMENTS 8,781,637 B2 * 7/2014 Eaves ........................ H02J 3/12
361/42
2012/0001493 A1 1/2012 Kudo et al.
(Continued)

FOREIGN PATENT DOCUMENTS

JP  2007-074334  3/2007
JP  2009-033782  2/2009
(Continued)

OTHER PUBLICATIONS

The Extended European Search Report, dated May 10, 2016, for the related European Patent Application No. 16158874.4.

*Primary Examiner* — Thienvu V Tran
*Assistant Examiner* — Brian K Baxter
(74) *Attorney, Agent, or Firm* — Greenblum & Bernstein, P.L.C.

(57) ABSTRACT

A foreign object detecting device includes first and second coils, the winding directions of which are the same, and a foreign object detecting circuit. The foreign object detecting circuit outputs a first detecting signal having a first predetermined waveform to a first terminal of the first coil and outputs a second detecting signal having a second predetermined waveform, which has the same polarity as the first predetermined waveform, to a third terminal of the second coil to cause magnetic fields generated from the first and second coils to repel each other. The foreign object detecting circuit measures an amount of change of the impedance value of the first or second coil which is caused by the presence of a foreign object. When the amount of change exceeds a predetermined value, the foreign object detecting circuit determines that there is a foreign object above the first or second coil.

20 Claims, 20 Drawing Sheets

(51) Int. Cl.
- *H02J 50/60* (2016.01)
- *H02J 50/40* (2016.01)
- *H02J 50/10* (2016.01)
- *G01V 3/10* (2006.01)

(58) Field of Classification Search
USPC .......................................................... 307/104
See application file for complete search history.

(56) References Cited

U.S. PATENT DOCUMENTS

| | | | |
|---|---|---|---|
| 2012/0146580 A1* | 6/2012 | Kitamura | H01F 38/14 320/108 |
| 2012/0181875 A1 | 7/2012 | Wechlin et al. | |
| 2012/0326522 A1 | 12/2012 | Fukushima | |
| 2013/0015719 A1 | 1/2013 | Jung et al. | |
| 2013/0093257 A1 | 4/2013 | Goto | |
| 2013/0119773 A1* | 5/2013 | Davis | H02J 5/005 307/104 |
| 2013/0134968 A1* | 5/2013 | Zibold | G01V 3/104 324/232 |
| 2013/0193771 A1* | 8/2013 | Teggatz | H01F 38/14 307/104 |
| 2013/0221913 A1* | 8/2013 | Kim | H02J 7/0042 320/108 |
| 2014/0070764 A1* | 3/2014 | Keeling | H02J 50/12 320/108 |
| 2014/0084857 A1 | 3/2014 | Liu et al. | |
| 2015/0022147 A1* | 1/2015 | Jung | H02J 5/005 320/108 |

FOREIGN PATENT DOCUMENTS

| | | |
|---|---|---|
| JP | 2012-016171 | 1/2012 |
| JP | 2013-026623 A | 2/2013 |
| JP | 2013-046526 A | 3/2013 |
| WO | 2009/014125 | 1/2009 |

* cited by examiner

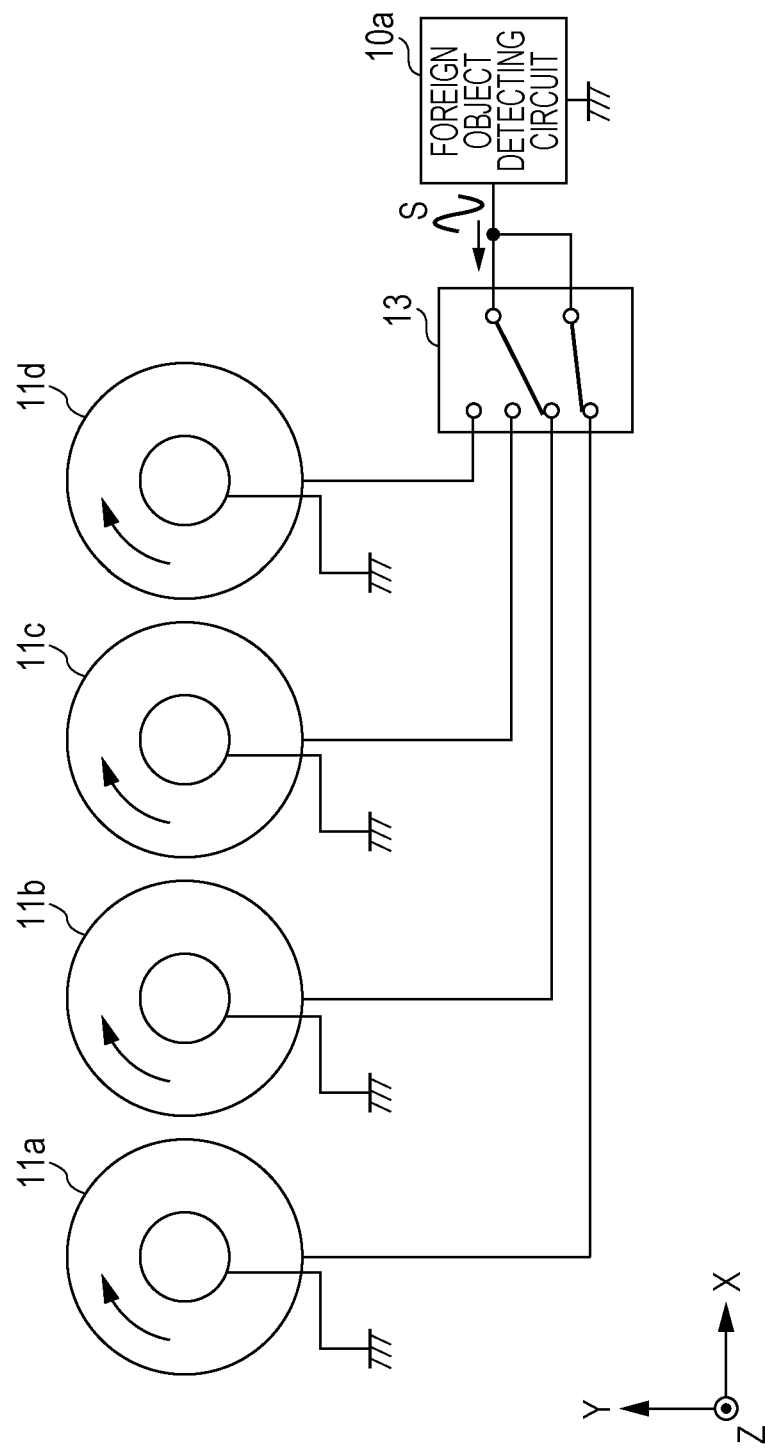

FOREIGN OBJECT DETECTING DEVICE, WIRELESS POWER TRANSMITTING APPARATUS, AND WIRELESS POWER TRANSFER SYSTEM

BACKGROUND

1. Technical Field

The present disclosure relates to a foreign object detecting device for detecting foreign objects, such as metal, human bodies, and animals, being present near a wireless power transmitting apparatus in a wireless power transfer system. The present disclosure also relates to a wireless power transmitting apparatus and a wireless power transfer system including such a foreign object detecting device.

2. Description of the Related Art

Nowadays, various mobile devices, for example, cell phones, are becoming widespread, and power consumption in mobile devices is increasing due to their enhanced functions and performance and an increase in the variety of the content. If power consumption in a mobile device operating with a limited capacity of batteries increases, the operating time of the mobile device decreases. As a technology for compensating for a limited capacity of batteries, a wireless power transfer system is attracting a lot of attention. A wireless power transfer system wirelessly transfers power from a wireless power transmitting apparatus (hereinafter simply referred to as a "power transmitting apparatus") to a wireless power receiving apparatus (hereinafter simply referred to as a "power receiving apparatus") by utilizing electromagnetic induction between a power transmitting coil of the power transmitting apparatus and a power receiving coil of the power receiving apparatus. Particularly in a wireless power transfer system using a resonance-type power transmitting coil and power receiving coil, high transmission efficiency can be maintained even when the position of the power transmitting coil and that of the power receiving coil are displaced from each other. Accordingly, the application of such a wireless power transfer system in various fields is being expected. It may be possible to widen the area where mobile devices can be charged by increasing the size of a power transmitting coil or by forming an array of multiple power transmitting coils.

SUMMARY

In a wireless power transfer system, it is desirable to detect foreign objects, such as metal, being present near a power transmitting coil or a power receiving coil with high precision and in a wide range.

In one general aspect, the techniques disclosed here feature a foreign object detecting device including: a first coil that includes a first wound wire having first and second terminals; a second coil that includes a second wound wire having third and fourth terminals and is disposed adjacent to the first coil, a winding direction of the second wound wire from the third terminal to the fourth terminal being the same as a winding direction of the first wound wire from the first terminal to the second terminal; and one foreign object detecting circuit operative to: output first detecting signal having a first predetermined waveform to the first terminal of the first coil and output a second detecting signal having a second predetermined waveform to the third terminal of the second coil to cause a first magnetic field generated from the first coil and a second magnetic field generated from the second coil to repel each other, a polarity of the second predetermined waveform being the same as a polarity of the first predetermined waveform, the repelled first and the second magnetic field being disposed between the first and second coils; measure an amount of change of an impedance value with respect to one of the first and second coils which is caused by the presence of a foreign object; and determine that a foreign object above the first coil or the second coil is present if the amount of change exceeds a predetermined value, where potential of each of the second and fourth terminals is at the same potential as reference potential of the foreign object detecting circuit.

According to an aspect of the present disclosure, it is possible to detect foreign objects with high precision and in a wider range than the related art.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 schematically illustrates a foreign object detecting device according to a first modified example of the first embodiment;

Figure 1:
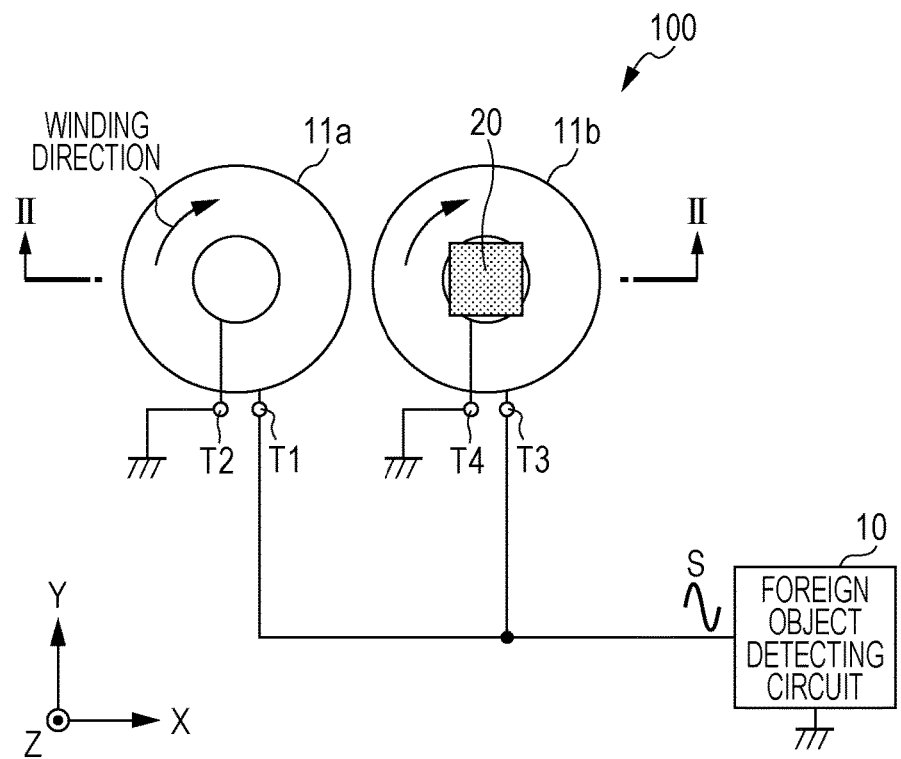
FIG. 1 schematically illustrates a foreign object detecting device according to a first embodiment.

DETAILED DESCRIPTION (Underlying Knowledge Forming Basis of the Present Disclosure)

The present inventors have found a problem that the range in which foreign objects can be detected with high precision is not sufficiently wide in the wireless power transfer system discussed in the Description of the Related Art. This problem will be discussed in detail below.

First, the definition of a "foreign object" will be explained. In the present disclosure, the "foreign object" is an object that may generate heat due to power transmitted between a power transmitting coil and a power receiving coil in a wireless power transfer system when such an object is located near the power transmitting coil or the power receiving coil. Examples of such an object are metal, human bodies, and animals.

In a wireless power transfer system, if a foreign object is present in a space through which power is transferred, the danger that heat will be generated from such a foreign object is increased. Now, it is assumed that a foreign object is metal. When power is wirelessly transferred from a power transmitting coil to a power receiving coil, a magnetic field is generated around the power transmitting coil due to a current flowing through this coil. Due to this magnetic field, an eddy current is induced and flows through the surface of the foreign object, which causes the foreign object to generate heat. The generated heat may cause a temperature rise by several tens of degrees.

In the Qi standards developed by the Wireless Power Consortium (WPC), the maximum permissible temperature is defined, and it is demanded that devices performing wireless power transfer in compliance with the Qi standards should not exceed this maximum permissible temperature. Accordingly, it is desirable that a foreign object should not enter a portion between a power transmitting coil and a power receiving coil while performing wireless power transfer. For further enhancing the safety, it is desirable to detect foreign objects near the power transmitting coil before starting transmitting power, and the power transmitting operation is started only when foreign objects are not detected as a result of performing a detecting operation. In this manner, it is possible to prevent the danger that heat generation will occur due to the presence of foreign objects.

There is also a demand for widening the area where devices, such as smartphones, can be charged. For example, there is a demand for increasing the range in which a power transmitting coil can transmit power by increasing the size of the power transmitting coil. In accordance with such a demand, it is desirable to widen the area where foreign objects can be detected with high precision.

Particularly in a recharging system in which a power transmitting apparatus is disposed under a console box in a vehicle, the distance between the power transmitting coil and a device, such as a smartphone, may be long. Even with a long distance between a power transmitting coil and a power receiving device in the height direction, it is still desirable to perform detection of foreign objects with high precision.

Japanese Patent No. 4525710 discloses a system in which a single coil is used both as a power transmitting coil and a detecting coil. In this system, a pulse signal is transmitted to the detecting coil, and a change in the voltage of the detecting coil is detected from reflected waves returned from the detecting coil, thereby determining the presence or the absence of foreign objects.

Japanese Patent No. 4780447 discloses that two or more detecting coils are disposed side by side in order to increase the range in which foreign objects can be detected. This publication also discloses that, for detecting foreign objects, currents out of phase with each other are supplied to a power transmitting coil (that is, a detecting coil) and a power receiving coil disposed in the axial direction. With this configuration, while preventing a signal transmitted from the power transmitting coil from being directly received by the power receiving coil, reflected waves returned from a foreign object are received with high sensitivity to detect the presence of a foreign object.

Japanese Unexamined Patent Application Publication No. 2012-16171 discloses a wireless power transfer system including a power transmitting apparatus having multiple power transmitting coils. The power transmitting coils also serve as detecting coils for detecting foreign objects. A foreign object detector is connected to each of the multiple power transmitting coils. The multiple foreign object detectors may perform detection of foreign objects for a plurality of locations at the same time.

As a result of analyzing the distribution of magnetic fields generated from the detecting coils disclosed in Japanese Patent Nos. 4525710 and 4780447 and Japanese Unexamined Patent Application Publication No. 2012-16171, the present inventors have found that, with the use of these detecting coils, it is difficult to increase the range in which foreign objects can be detected with high precision. This problem wifi be discussed in detail.

The technology disclosed in Japanese Patent No. 4525710 will first be described below.

The detecting coil disclosed in this publication is a planar coil in which a winding is wound on a plane perpendicular to the axis passing through the center of the winding of the detecting coil.

Figure 19:
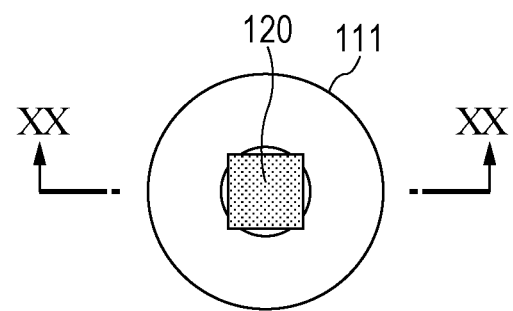
FIG. 19 is a top view illustrating a detecting coil of a foreign object detecting device of the related art.

FIG. 19 is a top view schematically illustrating a detecting coil 111 of a foreign object detecting device disclosed in this publication and a foreign object 120 positioned above the detecting coil 111. For a simple representation, in FIG. 19, merely the outermost peripheral portion and the innermost peripheral portion of the winding of the detecting coil 111 are shown. In the actual detecting coil, however, the winding is wound around a portion between the outermost peripheral portion and the innermost peripheral portion for multiple turns. The detecting coils illustrated in the other drawings are also simplified in a similar manner.

Figure 20:
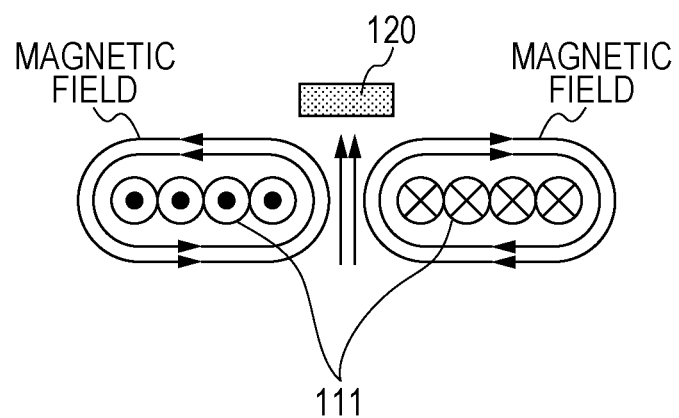
FIG. 20 is a sectional view of the detecting coil taken along line XX-XX of FIG. 19 and schematically illustrates generated magnetic fields.

FIG. 20 is a sectional view of the detecting coil 111 and the foreign object 120 taken along line XX-XX of FIG. 19 and schematically illustrates a magnetic field distribution around the detecting coil 111. In FIG. 20, the state in which a signal current is flowing within the winding of the detecting coil 111 counterclockwise as viewed from the foreign object 120 is shown. In the present disclosure, the right-handed direction as viewed from a foreign object or a power receiving coil will be referred to as the "clockwise" direction, and the left-handed direction as viewed from a foreign object or a power receiving coil will be referred to as the "counterclockwise" direction.

The foreign object 120 (a metal piece, for example) being near the detecting coil 111 interacts with the magnetic fields generated around the detecting coil 111 to change the frequency and/or the amplitude of the signal current flowing through the detecting coil 111. By detecting this change, the foreign object 120 can be detected. The range in which the detecting coil 111 can detect the foreign object 120 is substantially restricted to the area above the detecting coil 111 on which the winding is wound. If the foreign object 120 is located right above the center of the winding of the detecting coil 111, it is more likely to be detected. However, if the foreign object 120 is separated from the winding, it is much less likely to be detected. That is, the detection sensitivity is considerably decreased.

Figure 21A:
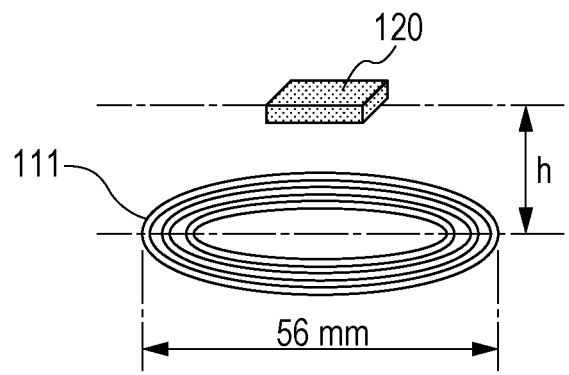
FIG. 21A illustrates the positional relationship between the detecting coil and a metal object shown in FIG. 19.
Figure 21B:
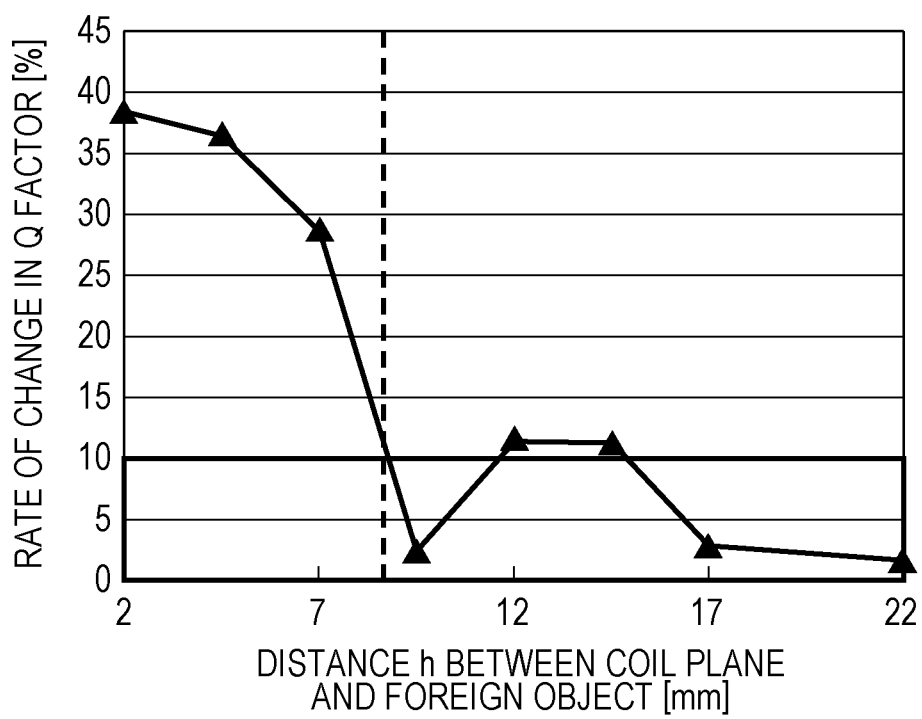
FIG. 21B is a graph illustrating the rate by which the Q factor of the detecting coil shown in FIG. 19 is changed with respect to the distance.

FIGS. 21A and 21B illustrate the results of experiments conducted for explaining the above-described situation. As shown in FIG. 21A, the foreign object 120 (metal piece) was located above a line extending on the axis of the detecting coil 111, and the rate of a change in the Q factor was measured while varying the distance h between the foreign object 120 and the plane on which the winding of the detecting coil 111 was formed (also be called the "coil plane"). The rate of a change in the Q factor represents how much the Q factor is changed from the value of the Q factor when there is no foreign object 120. In this experiment, as the detecting coil 111, a circular detecting coil having a diameter of 56 mm was used as an example, and as the foreign object 120, a rectangular-parallelepiped iron plate (20×20×1 mm) was used as an example.

FIG. 21B shows that, when the distance h reaches about 9 mm, the rate of a change in the Q factor (=$2\pi fL/R$, f: frequency, L: inductance, and R: resistance) of the coil 111 is reduced to about 10%, that is, the detection sensitivity is considerably decreased. It is seen from this result that, in the configuration disclosed in this publication, the intensity of a magnetic field is significantly decreased at a position separated from the coil plane. It is thus difficult to increase the distance in the height direction by which foreign objects can be detected with high precision.

The technology disclosed in Japanese Patent No. 4780447 will now be described below.

In a planar flexible antenna disclosed in this publication, a plurality of detecting coil groups each including multiple planar coils disposed in the axial direction are disposed in the horizontal direction. With this configuration, it is possible to increase the range in which foreign objects can be detected. In this configuration, the multiple planar coils included in each detecting coil group are connected in parallel with each other. Accordingly, the multiple planar coils may be considered as a single coil. For the sake of simplicity, each detecting coil group will be considered as one detecting coil.

Figure 22:
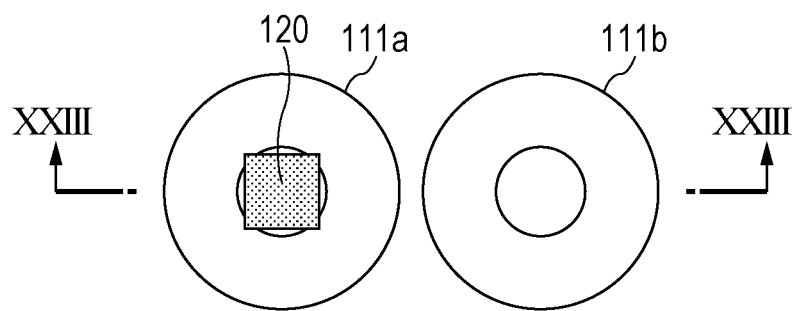
FIG. 22 is a top view illustrating detecting coils of a foreign object detecting device of the related art.

FIG. 22 is a top view schematically illustrating two adjacent detecting coils 111a and 111b among the multiple detecting coils forming the planar flexible antenna disclosed in this publication. In FIG. 22, the state in which the foreign object 120 is located above the center of the detecting coil 111a is shown.

Figure 23:
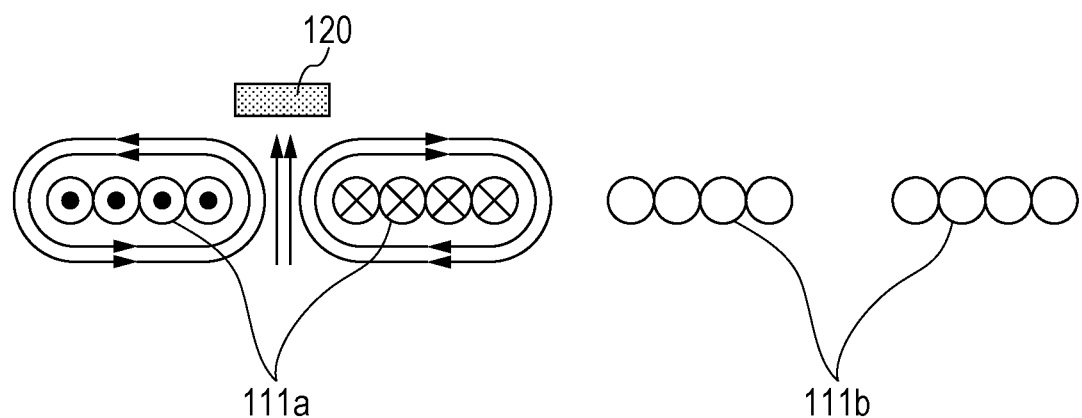
FIG. 23 is a sectional view of the detecting coils taken along line XXIII-XXIII of FIG. 22 and schematically illustrates generated magnetic fields.

FIG. 23 is a sectional view of the detecting coils 111a and 111b and the foreign object 120 taken along line XXIII-XXIII of FIG. 22 and schematically illustrates a magnetic field distribution around the detecting coil 111a. In this case, since the foreign object 120 is located above the detecting coil 111a, a detecting signal is input only into the detecting coil 111a. In this manner, in the configuration disclosed in this publication, a detecting signal is input only into one detecting coil (group) at one time.

As shown in FIG. 23, even in the case of the use of the two detecting coils 111a and 111b, the distribution of magnetic fields generated in this configuration is similar to that in the case of the use of one detecting coil as shown in FIG. 20. Accordingly, with the configuration disclosed in this publication, the magnetic field at a position separated from the coil plane is not sufficiently strong. It is thus difficult to increase the distance in the height direction by which foreign objects can be detected with high precision.

Japanese Unexamined Patent Application Publication No. 2012-16171 discloses a power transmitting apparatus including multiple power transmitting coils (foreign object detecting coils). Each of the multiple power transmitting coils is connected to a foreign object detector and is also used as a coil for detecting foreign objects. The multiple foreign object detectors may perform detection of foreign objects for a plurality of locations at the same time. However, there is only a single coil that performs detection of foreign objects at one time. Accordingly, as well as in the configurations disclosed in Japanese Patent Nos. 4525710 and 4780447, in the configuration disclosed in this publication, the magnetic field at a position separated from the coil plane is not sufficiently strong. It is thus difficult to increase the distance in the height direction by which foreign objects can be detected with high precision.

In view of the above-described study, the present inventors have found a new problem that, even with the use of a foreign object detecting device in which a plurality of detecting coils are disposed, such as that disclosed in Japanese Patent No. 4780447 and Japanese Unexamined Patent Application Publication No. 2012-16171, it is not possible to detect foreign objects with high precision if there is a long distance between a detecting coil and a foreign object. In the configurations disclosed in Japanese Patent Nos. 4525710 and 4780447 and Japanese Unexamined Patent Application Publication No. 2012-16171, it is difficult to increase the distance, in particular, the distance in the height direction, by which foreign objects can be detected with high precision.

In a wireless power transfer system, it is desired that power be stably transferred from a power transmitting coil to a power receiving coil substantially without changing a magnetic field generated from the power transmitting coil while maintaining the distance between the power transmitting coil and the power receiving coil to a certain distance.

Power to be transmitted from the power transmitting coil to the power receiving coil is, for example, about 1 W to 50 kW. If a foreign object enters a portion between the power transmitting coil and the power receiving coil during power transmission, there is a danger that this foreign object may generate heat.

On the other hand, power of a signal transmitted from a detecting coil while performing detection of foreign objects is, for example, about 10 to 100 mW. Power of a signal transmitted from the detecting coil is much smaller (for example, about one thousandth or smaller of) than that transmitted from the power transmitting coil to the power receiving coil. Accordingly, when performing detection of foreign objects, there is no danger that heat generation from foreign objects will occur.

Since the purpose of the use of a power transmitting coil is different from that of a detecting coil, power to be output from the power transmitting coil is very different from that from the detecting coil. If power is transmitted without detecting foreign objects, there may be a danger that heat generation from foreign objects will occur, as described above.

As discussed above, it is desirable to increase the distance by which foreign objects can be detected with high precision in a wireless power transfer system. In view of the above-described study, the present inventors have conceived the following aspects.

A foreign object detecting device according to an aspect of the present disclosure includes a first coil, a second coil, and a foreign object detecting circuit. The first coil includes a first wound wire having first and second terminals. The second coil includes a second wound wire having third and fourth terminals and is disposed adjacent to the first coil. The winding direction of the second wound wire from the third terminal to the fourth terminal is the same as a winding direction of the first wound wire from the first terminal to the second terminal. The foreign object detecting circuit outputs a first detecting signal having a first predetermined waveform to the first terminal of the first coil and also outputs a second detecting signal having a second predetermined waveform to the third terminal of the second coil to cause a magnetic field generated from the first coil and a magnetic field generated from the second coil to repel each other between the first and second coils. The polarity of the second predetermined waveform is the same as a polarity of the first predetermined waveform. The foreign object detecting circuit measures an amount of change of an impedance value with respect to one of the first and second coils in the case of the presence of a foreign object. The foreign object detecting circuit determines that there is a foreign object above the first coil or the second coil if the amount of change exceeds a predetermined value. The second and fourth terminals are at the same potential as a reference potential of the foreign object detecting circuit.

According to the above-described aspect, the foreign object detecting device includes a first coil, a second coil, and a foreign object detecting circuit. The first coil includes a first wound wire having first and second terminals. The second coil includes a second wound wire having third and fourth terminals and is disposed adjacent to the first coil. The winding direction of the second wound wire from the third terminal to the fourth terminal is the same as a winding direction of the first wound wire from the first terminal to the second terminal.

The foreign object detecting circuit outputs a first detecting signal having a first predetermined waveform to the first terminal of the first coil and also outputs a second detecting signal having a second predetermined waveform to the third terminal of the second coil to cause a magnetic field generated from the first coil and a magnetic field generated from the second coil to repel each other between the first and second coils. The polarity of the second predetermined waveform is the same as a polarity of the first predetermined waveform. With this operation, it is possible to intensify a magnetic field above the first and second coils.

The foreign object detecting circuit measures an amount of change of an impedance value with respect to one of the first and second coils in the case of the presence of a foreign object. The foreign object detecting circuit determines that there is a foreign object above the first coil or the second coil if the amount of change exceeds a predetermined value.

With this configuration, not only the range in which foreign objects can be detected is increased by disposing multiple coils, but also a foreign object above a first coil or a second coil can be detected with high precision by intensifying the magnetic field above the first and second coils.

As a result, it is possible to increase the range (in particular, the range in the height direction) in which foreign objects can be detected with high precision.

Additionally, general-purpose detecting coils may be safely used, thereby suppressing an increase in the number of components, dimensions, and manufacturing cost of the foreign object detecting device.

In the above-described description, "the amount of change of impedance value" means the amount by which the impedance value from that detected when there is no foreign object near the first and second coils. Accordingly, the difference between the impedance value when there is no foreign object near the first and second coils and the current impedance value is "the amount of change of the impedance value". Measuring of the amount of change of the impedance value includes, not only directly measuring of the amount of change of impedance value, but also measuring of a change in another physical amount of change, which varies in accordance with a change in the impedance value. By measuring such a change in physical amount of change, a change in the impedance value can be indirectly measured. Examples of physical quantities which change in accordance with a change in the impedance are a voltage value, a current value, the frequency of a voltage or a current, an inductance value, a coupling coefficient, and a Q factor of at least one of the first and second coils. Measuring of the amount of change in the frequency and/or the amplitude of a reflection signal based on at least one of the first and second detecting signals or combined reflection signals based on the first and second detecting signals is also measuring of the amount of change of the impedance value. The above-described definitions are also applicable to the content of the disclosure which will be given below.

Specific embodiments of the present disclosure will be described below. In the following description, XYZ coordinates shown in the drawings will be used if necessary.

First Embodiment

FIG. 1 schematically illustrates a foreign object detecting device 100 according to a first embodiment. The foreign object detecting device 100 includes detecting coils 11a and 11b and a foreign object detecting circuit 10 for detecting foreign objects. Hereinafter, detecting coils may also be simply called "coils". The detecting coils 11a and 11b are disposed adjacent to each other in one direction on the same plane. In FIG. 1, the state in which a foreign object 20 is located at a position facing the detecting coil 11b is shown. The foreign object detecting circuit 10 outputs a detecting signal S so that currents will flow through the two detecting coils 11a and 11b in the same direction at the same time. This causes a magnetic field generated from the detecting coil 11a and a magnetic field generated from the detecting coil 11b to repel each other between the detecting coils 11a and 11b. Then, the foreign object 20 is detected on the basis of an amount of change of an impedance value with respect to at least one of the detecting coils 11a and 11b is changed due to the presence of the foreign object 20.

The two detecting coils 11a and 11b are shown in FIG. 1, but, in actuality, more detecting coils may be disposed. Each detecting coil has two terminals at both ends of a wound wire. One of the terminals is set to be at the same potential as a reference potential of the foreign object detecting circuit 10, while the other terminal is connected to an output terminal of the foreign object detecting circuit 10. The reference potential is a potential, which serves as a reference for a detecting signal output from the foreign object detecting circuit 10, and is typically a ground potential. The output terminal of the foreign object detecting circuit 10 is a terminal from which the detecting signal S for detecting a foreign object is output. Hereinafter, a description will be given below, assuming that the reference potential is a ground potential. However, the reference potential may be any potential.

At a certain timing, the foreign object detecting circuit 10 causes currents to flow through the two adjacent detecting coils 11a and 11b selected among the multiple detecting coils in the same direction. At another timing, the foreign object detecting circuit 10 causes currents to flow through a pair of adjacent detecting coils (for example, the detecting coil 11b and a third detecting coil (not shown)) different from the pair of detecting coils 11a and 11b in the same direction. This is implemented by switching detecting coils to which the detecting signal S is output from the foreign object detecting circuit 10. In this manner, the foreign object detecting circuit 10 performs a foreign object detecting operation while sequentially switching two coils that receive the detecting signal S. This makes it possible to perform detection of foreign objects over the entire area where the multiple detecting coils are disposed. Hereinafter, for the sake of simple description, the specific configuration and operation will be described below by focusing only on the two detecting coils 11a and 11b shown in FIG. 1.

Each of the detecting coils 11a and 11b includes a wound wire (winding) having two terminals. The first coil 11a has a first terminal T1 and a second terminal T2. The second coil 11b has a third terminal T3 and a fourth terminal T4. The first terminal T1 and the third terminal T3 are outer terminals positioned at the outer ends of the windings. Hereinafter, the first terminal T1 and the third terminal T3 may be simply referred to as "outer terminals". The second terminal T2 and the fourth terminal T4 are inner terminals positioned at the inner ends of the windings. Hereinafter, the second terminal T2 and the fourth terminal T4 may be simply referred to as "inner terminals". In FIG. 1, the winding direction of each wire is indicated by the arrow. In the first embodiment, the winding direction of the wires is a direction starting from the outer terminals T1 and T3 to the inner terminals T2 and T4, respectively, which is the clockwise direction. In the present disclosure, however, the winding direction is not particularly restricted.

The outer terminals T1 and T3 are connected to the output terminal of the foreign object detecting circuit 10 and receive a detecting signal output from the foreign object detecting circuit 10. The inner terminals T2 and T4 are connected to a ground. The outer terminals T1 and T3 may be disposed at any position between the outer portions of the windings and the foreign object detecting circuit 10. The inner terminals T2 and T4 may be disposed at any position between the inner portions of the windings and a ground. The outer terminals T1 and T3 may be nodes that are directly connected to the foreign object detecting circuit 10, and the inner terminals T2 and T4 may be nodes that are directly connected to a ground. In this case, the terminals may not be clearly seen, unlike those in the example of FIG. 1. In the reference drawings in the following description, the symbol representing the terminals (white circle in FIG. 1) may be omitted.

The connection relationship between the outer terminals and the foreign object detecting circuit 10 and the connection relationship between the inner terminals and a ground may be opposite to those discussed above. That is, the outer terminals may be connected to a ground, and the inner terminals may be connected to the output terminal of the foreign object detecting circuit 10. Depending on the manner in which the wires are wound, there may be a mode in which it is not clear which terminals are outer terminals and which terminals are inner terminals. The present disclosure includes such a mode.

The foreign object detecting circuit 10 transmits (may also be called "outputs" in the present disclosure) the detecting signal S having a predetermined waveform to the two adjacent detecting coils 11a and 11b. The foreign object detecting circuit 10 then receives reflection signals generated as a result of the detecting signal S being reflected by the two detecting coils 11a and 11b, and determines whether or not there is a foreign object located above the detecting coil 11a or 11b, on the basis of the reflection signals. The detecting signal S is caused to branch off as a first detecting signal to flow through one of the detecting coils 11a and 11b and as a second detecting signal to flow through the other one of the detecting coils 11a and 11b. The waveform of the first detecting signal and that of the second detecting signal are substantially the same and have the same polarity. In the example shown in FIG. 1, the first detecting signal is output to the outer terminal T1 of the detecting coil 11a, while the second detecting signal is output to the outer terminal T3 of the detecting coil 11b. Accordingly, one of the two currents induced by the first and second detecting signals flows clockwise on the plane including the detecting coils 11a and 11b, and at the same time, the other current also flows clockwise on the plane including the detecting coils 11a and 11b. That is, currents flow through the detecting coils 11a and 11b in the same direction.

The detecting signal S may be an alternating current (AC) signal or a pulse signal. The pulse signal may be a unipolar or bipolar pulse signal. In FIG. 1, the detecting signal S is an AC signal having sine waves by way of example.

Figure 2:
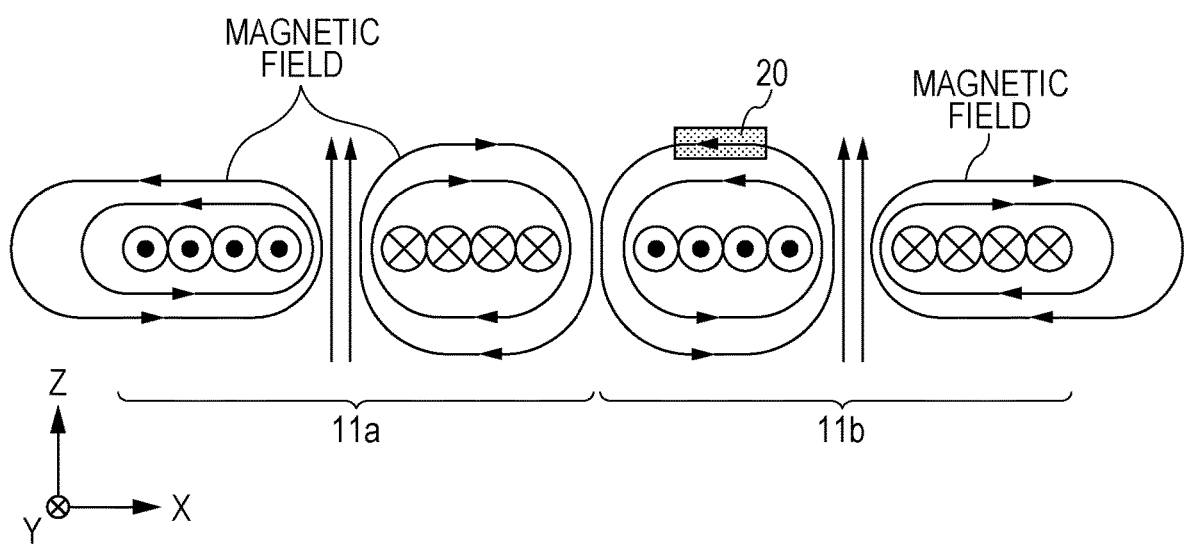
FIG. 2 is a sectional view of detecting coils taken along line II-II of FIG. 1 and schematically illustrates generated magnetic fields.

FIG. 2 is a sectional view of the detecting coils $11a$ and $11b$ taken along line II-II of FIG. 1 and schematically illustrates generated magnetic fields. The foreign object detecting circuit 10 determines whether or not there is a foreign object 20 above the detecting coil $11a$ or $11b$ by observing the reflection signals returned from the detecting coils $11a$ and $11b$. As shown in FIG. 2, upon receiving the detecting signal S output from the foreign object detecting circuit 10, the detecting coils $11a$ and $11b$ each form a magnetic field near the corresponding detecting coil $11a$ or $11b$. At a certain moment, a current flows through the detecting coil $11a$ clockwise, while a current flows through the detecting coil $11b$ also clockwise. At another moment, a current flows through the detecting coil $11a$ counterclockwise, while a current flows through the detecting coil $11b$ also counterclockwise. FIG. 2 shows the state in which currents flow through the two detecting coils $11a$ and $11b$ counterclockwise. Accordingly, similar magnetic fields are generated in the two detecting coils $11a$ and $11b$. However, since the detecting coils $11a$ and $11b$ are disposed adjacent to each other, magnetic fields in the adjacent portion of the detecting coils $11a$ and $11b$ are compressed in the X direction and are intensified in the Z direction, as shown in FIG. 2. In other words, the magnetic fields between the detecting coils $11a$ and $11b$ repel each other so that they are intensified in the Z direction. In this case, if the foreign object 20 is present above the detecting coil $11a$ or $11b$, part of the magnetic field is blocked by the foreign object 20 to change the reflection signal. When the foreign object 20 generates a capacitance with the detecting coil $11a$ or $11b$, the inductance of the detecting coil $11a$ or $11b$ is changed due to the generated capacitance. In accordance with a change in the inductance, the frequency of the reflection signal is also changed. If the inductance of the detecting coil $11a$ or $11b$ decreases, the frequency of the reflection signal increases. In contrast, if the inductance of the detecting coil $11a$ or $11b$ increases, the frequency of the reflection signal decreases. When the foreign object 20 is heated due to an induced current, energy of the detecting signal S is consumed to decrease the amplitude of the reflection signal. A change in a reflection signal may be detected by measuring the reflection signal directly or by measuring a composite signal of a transmitted detecting signal and a received reflection signal.

The foreign object detecting circuit 10 determines the presence or the absence of the foreign object 20, for example, in the following manner. First, the foreign object detecting circuit 10 measures the frequency and/or the amplitude of reflection signals or a composite signal when there is no foreign object 20 near the detecting coils $11a$ and $11b$, and then stores the measured values in a memory as reference values. Upon detecting a reflection signal or a composite signal having the frequency and/or the amplitude different from the reference values, the foreign object detecting circuit 10 determines that there is a foreign object 20.

In the above-described example, the presence or the absence of a foreign object is determined on the basis of a change in the frequency and/or the amplitude of received reflection signals or a composite signal. Alternatively, the presence or the absence of a foreign object may be determined, on the basis of a change in another physical amount of change, which varies in accordance with a change in the impedance, as described above. This alternative is applicable to other embodiments, which will be discussed later.

Figure 3:
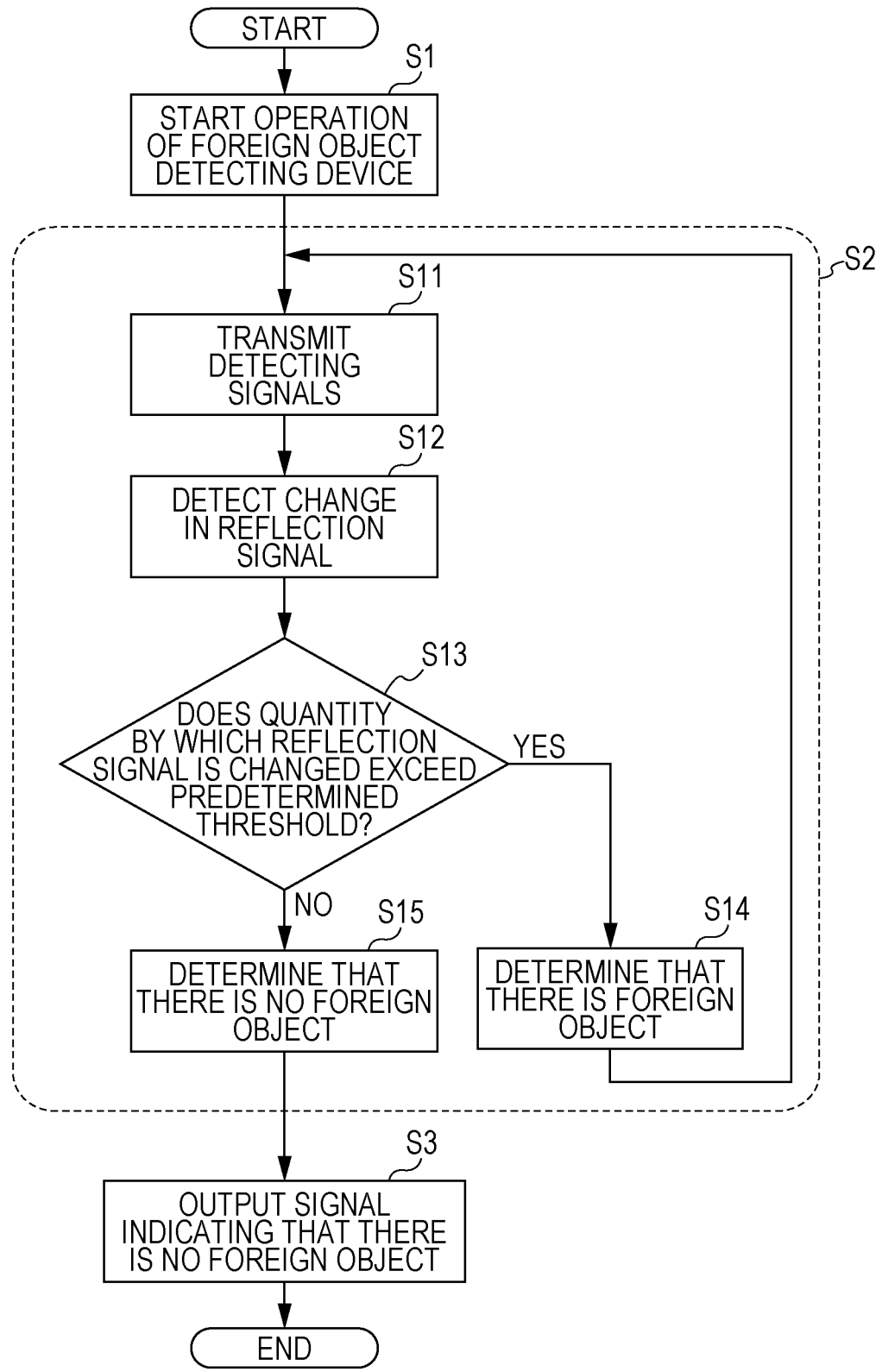
FIG. 3 is a flowchart illustrating an example of the operation of the foreign object detecting device according to the first embodiment.

An example of the operation of the foreign object detecting device 100 according to the first embodiment will be described below with reference to FIG. 3.

First, in step S1, the operation of the foreign object detecting device 100 is started, for example, the foreign object detecting device 100 (such as an integrated circuit (IC) and a memory) is initialized. Then, in step S2, foreign object detecting processing is executed. The foreign object detecting processing in step S2 will be discussed below in detail. In step S11 the foreign object detecting circuit 10 transmits the detecting signal S to the first coil $11a$ and the second coil $11b$. The detecting signal S branches off as a first detecting signal (also called "first detecting signal") to flow through the detecting coil $11a$ and as a second detecting signal (also called "second detecting signal") to flow through the detecting coil $11b$. Due to these two signals, currents flow through the first and second coils $11a$ and $11b$ clockwise or counterclockwise. As a result, a combined magnetic field of a first magnetic field from the first coil $11a$ and a second magnetic field from the second coil $11b$ is generated. In this case, the "combined magnetic field" refers to the entirety of the first magnetic field generated from the first coil $11a$ and the entirety of the second magnetic field generated from the second coil $11b$. If a foreign object is present, the combined magnetic field is changed. Accordingly, a reflection signal obtained from each of the first and second detecting signals is also changed in accordance with a change in the combined magnetic field due to the presence of a foreign object.

Then, in step S12, the foreign object detecting circuit 10 detects a change in the reflection signal caused by the presence of a foreign object.

Then, in step S13, the foreign object detecting circuit 10 determines whether or not the amount of change of the reflection exceeds a predetermined threshold. The amount of change of the reflection signal refers to a difference between the value of the frequency or the amplitude of a reflection signal when there is no foreign object near the first and second coils $11a$ and $11b$ and that of the reflection signal detected by the foreign object detecting circuit 10. If it is determined in step S13 that the above-described amount of change exceeds the predetermined threshold, the foreign object detecting circuit 10 determines in step S14 that there is a foreign object above the first coil $11a$ or the second coil $11b$. If it is determined in step S13 that the above-described amount of change does not exceed the predetermined threshold, the foreign object detecting circuit 10 determines in step S15 that there is no foreign object above the first coil $11a$ or the second coil $11b$. If it is determined in step S14 that there is a foreign object, the foreign object detecting circuit 10 repeats steps S11 through S14 until it determines in step S13 that the above-described amount of change does not exceed the predetermined threshold, that is, it determines in step S15 that there is no foreign object.

If it is determined in step S15 that there is no foreign object as a result of executing the foreign object detecting processing in step S2, the process proceeds to step S3. In step S3, the foreign object detecting circuit 10 outputs a signal indicating that there is no foreign object. If the foreign object detecting device 100 is included in a wireless power transfer system, this signal is transmitted to, for example, a power transmitting apparatus in this system. Upon receiving this signal, the power transmitting apparatus performs a certain operation, such as starting of a power transmitting operation. The destination of this signal is not restricted to the power transmitting apparatus, and instead, the signal may be transmitted to any device that requires information concerning the presence or the absence of a foreign object.

The advantages of the foreign object detecting device 100 according to the first embodiment will now be described below with reference to FIGS. 4A through 4D.

Figure 4A:
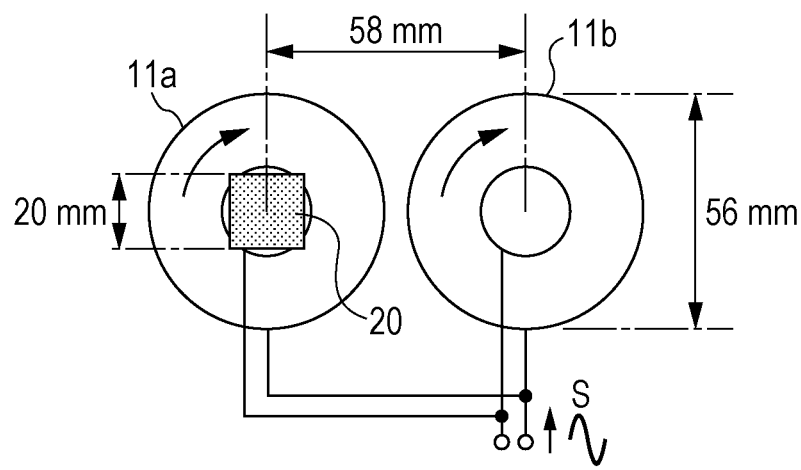
FIG. 4A is a top view illustrating detecting coils of a foreign object detecting device in an implementation example of the first embodiment.

FIG. 4A is a top view schematically illustrating the detecting coils 11a and 11b in an implementation example of the foreign object detecting device 100 shown in FIG. 1. The winding direction of the wire of the detecting coil 11a from the outer terminal to the inner terminal is the same as that of the detecting coil 11b from the outer terminal to the inner terminal. The diameter of each of the detecting coils 11a and 11b is 56 mm. The number of turns of the wire of each of the detecting coils 11a and 11b is 12. The center-to-center distance of each of the detecting coils 11a and 11b is 58 mm. A foreign object 20 constituted by a rectangular-parallelepiped iron plate (20×20×1 mm) is disposed above and at the center of the detecting coil 11a. Under the above-described conditions, the rate of a change in the Q factor was measured while varying the distance between the top surface of the detecting coil 11a and the bottom surface of the foreign object 20. The feeding points of the detecting coils 11a and 11b were connected to the foreign object detecting circuit 10 which output the single detecting signal S. The detecting coils 11a and 11b were connected to the foreign object detecting circuit 10 so that currents would flow through the detecting coils 11a and 11b in the same direction.

Figure 4B:
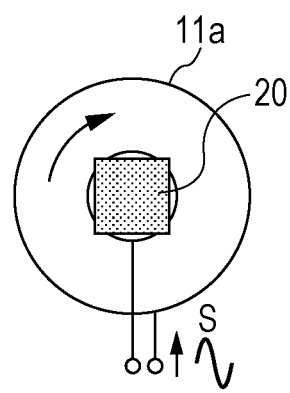
FIG. 4B is a top view illustrating a detecting coil of a foreign object detecting device according to a first comparative example.

FIG. 4B is a top view illustrating a detecting coil 11a of a foreign object detecting device according to a first comparative example. This foreign object detecting device includes only the detecting coil 11a of the two detecting coils 11a and 11b shown in FIG. 4A. A foreign object 20 constituted by a rectangular-parallelepiped iron plate (20×20×1 mm) is disposed above and at the center of the detecting coil 11a. Under these conditions, the rate of a change in the Q factor was measured while varying the distance between the top surface of the detecting coil 11a and the bottom surface of the foreign object 20. The feeding point of the detecting coil 11a was connected to the foreign object detecting circuit which output the detecting signal S.

Figure 4C:
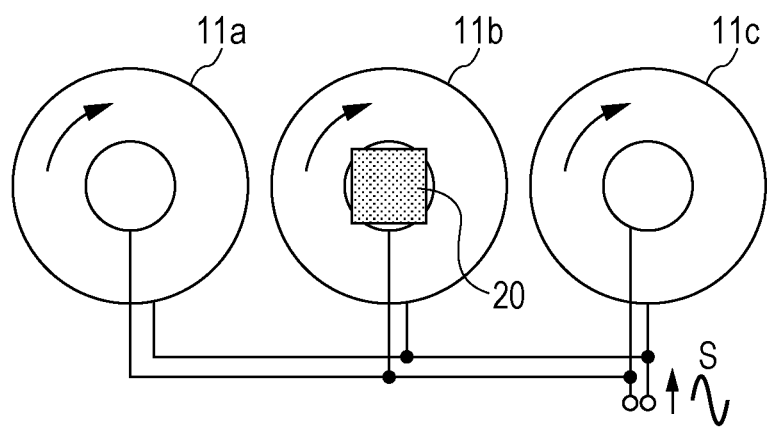
FIG. 4C is a top view illustrating detecting coils of a foreign object detecting device according to a second comparative example.

FIG. 4C is a top view schematically illustrating the detecting coils 11a through 11c of a foreign object detecting device according to a second comparative example. The three detecting coils 11a through 11c are aligned with each other. The structure of each of the detecting coils 11a through 11c is the same as that of the detecting coil 11a shown in FIG. 4A. A foreign object 20 constituted by a rectangular-parallelepiped iron plate (20×20×1 mm) is disposed above and at the center of the detecting coil 11b. Under the above-described conditions, the rate of a change in the Q factor was measured while varying the distance between the top surface of the detecting coil 11b and the bottom surface of the foreign object 20. The feeding points of the detecting coils 11a through 11c were connected to the foreign object detecting circuit which output the detecting signal S. The detecting coils 11a through 11c were connected to the foreign object detecting circuit so that currents would flow through the detecting coils 11a through 11c in the same direction.

Figure 4D:
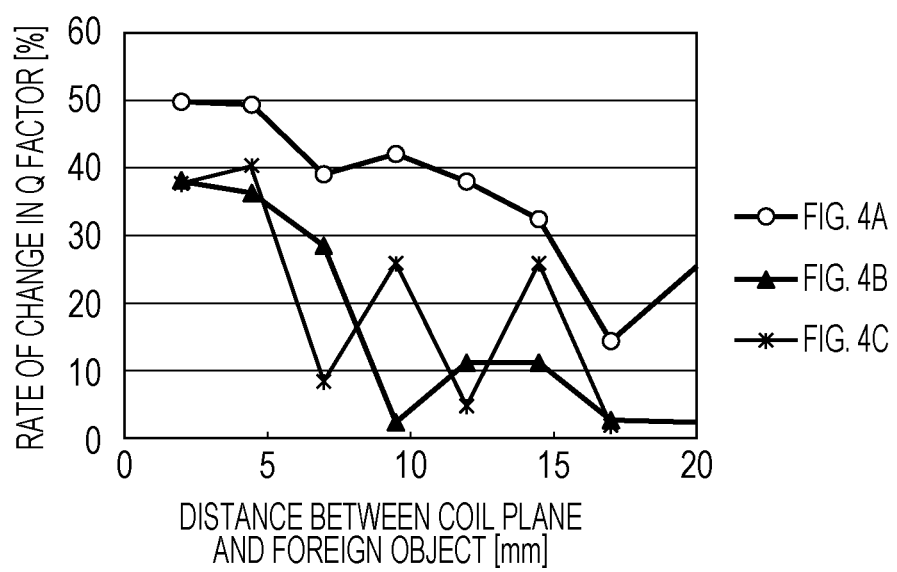
FIG. 4D is a graph illustrating the rates by which the Q factors are changed due to the presence of foreign objects with respect to the distance in the configurations shown in FIGS. 4A through 4C.

FIG. 4D is a graph illustrating the rates by which the Q factors ($=2\pi fL/R$, f: frequency, L: inductance, and R: resistance) are changed due to the presence of the foreign objects 20 in the configurations shown in FIGS. 4A through 4C with respect to the distance. Concerning the detecting coils 11a and 11b shown in FIG. 4A, the Q factor in the case of the presence of the foreign object 20 (Q factor calculated from the complex impedance: Q1) was measured, and the rate $\Delta Q1$ representing how much the Q factor (Q1) changed from the Q factor (Q01) in the case of the absence of a foreign object was calculated by using the following equation.

$$\Delta Q1=(Q1-Q01)/Q01\times100[\%] \quad\quad \text{(FIG. 4A)}$$

Similarly, concerning the detecting coil 11a shown in FIG. 4B, the Q factor (Q2) in the case of the presence of the foreign object 20 was measured, and the rate $\Delta Q2$ representing how much the Q factor (Q2) changed from the Q factor (Q02) in the case of the absence of a foreign object was calculated by using the following equation.

$$\Delta Q2=(Q2-Q02)/Q02\times100[\%] \quad\quad \text{(FIG. 4B)}$$

Similarly, concerning the detecting coils 11a through 11c shown in FIG. 4C, the Q factor in the case of the presence of the foreign object 20 (Q factor calculated from the complex impedance: Q3) was measured, and the rate $\Delta Q3$ representing how much the Q factor (Q3) changed from the Q factor (Q03) in the case of the absence of a foreign object was calculated by using the following equation.

$$\Delta Q3=(Q3-Q03)/Q03\times100[\%] \quad\quad \text{(FIG. 4C)}$$

FIG. 4D shows that the rate $\Delta Q1$, which is a rate of a change in the Q factor of the first embodiment shown in FIG. 4A, is greater than the rate $\Delta Q2$ in the first comparative example shown in FIG. 4B and the rate $\Delta Q3$ in the second comparative example shown in FIG. 4C regardless of the distance between the coil plane and the foreign object 20. After the distance exceeds about 10 mm, a drop in the rate $\Delta Q1$ is smaller than a drop in the rate $\Delta Q2$ and a drop in the rate $\Delta Q3$. That is, in the configuration of the first embodiment, more stable output can be obtained than in the configuration of the first comparative example using the single detecting coil 11a and the configuration of the second comparative example using the three detecting coils 11a through 11c. The reason for this is that the combined magnetic field formed by the two detecting coils 11a and 11b is compressed within a region sandwiched by the detecting coils 11a and 11b, as shown in FIG. 2, so that the magnetic field above this region is intensified.

In the configuration using the three coils 11a through 11c shown in FIG. 4C, the rate $\Delta Q3$ is decreased more sharply than the rate $\Delta Q1$ in the configuration using the two adjacent coils 11a and 11b shown in FIG. 4A, and is even close to the rate $\Delta Q2$ in the configuration using the single coil 11a shown in FIG. 4B. The reason for this may be as follows. If a foreign object is present near a coil, it produces a strong influence on the distribution of a magnetic field generated from this coil to change the Q factor. If the number of coils is excessively increased, the influence on the distribution of a magnetic field generated from one coil becomes relatively small when the influence on the distribution of magnetic fields generated from all the coils is considered. As a result, the rate of a change in the Q factor is decreased.

As described above, it is seen that in a case in which the number of coils to which power is supplied is two, the highest rate of a change in the Q factor is obtained, and the detection sensitivity is enhanced accordingly.

In the first embodiment, power is supplied to the two coils 11a and 11b so that currents will flow through the two coils 11a and 11b in the same direction at the same time. A detecting signal input into each of the two detecting coils 11a and 11b may be a period signal (for example, an AC signal having a sine wave) in which the waveform of the first half of each period has the inverted shape of the waveform of the second half. In this case, detecting signals or currents substantially in phase with each other (phase difference is substantially 0) flow through the detecting coils 11a and 11b. This makes it possible to detect foreign objects being present above the detecting coils 11a and 11b with high precision. In this case, "substantially in phase" means that the phase difference between two detecting signals or currents flowing through the detecting coils 11a and 11b is within a range to such a degree as to detect the foreign object 20 above the detecting coil 11a or 11b. This advantage may be achieved if the range of the phase difference between two detecting signals or currents is 0±90 degrees, but, more desirably, the range of the phase difference is 0±45 degrees.

As described above, in the foreign object detecting device 100 according to the first embodiment, it is possible to more reliably detect foreign objects separated from two detecting coils, while suppressing an increase in the number of components, dimensions, and manufacturing cost of the foreign object detecting device.

The results of examining the inductance which may influence the detection sensitivity will be discussed below.

Figure 5A:
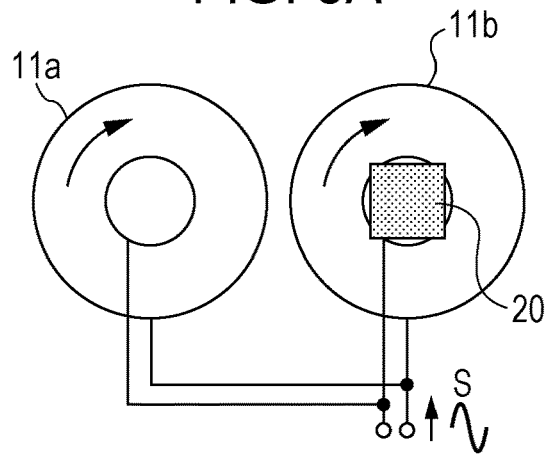
FIG. 5A is a top view illustrating detecting coils of a foreign object detecting device in an implementation example of the first embodiment.
Figure 5B:
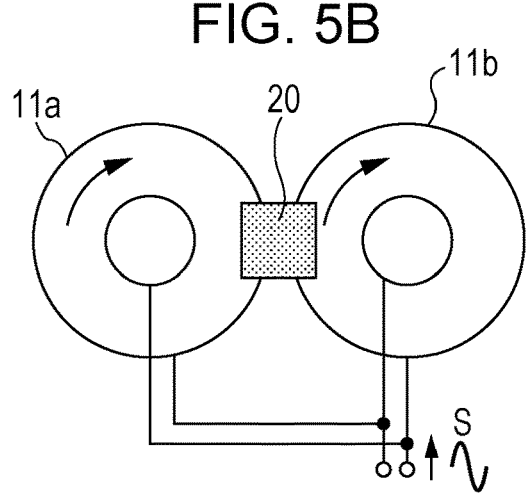
FIG. 5B is a top view illustrating detecting coils of a foreign object detecting device according to a third comparative example.
Figure 5C:
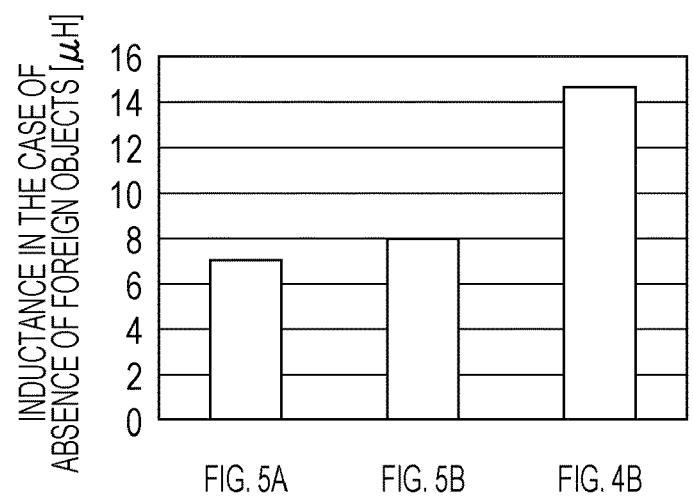
FIG. 5C is graph illustrating the results of measuring inductance values in the case of the absence of foreign objects in the configurations shown in FIGS. 5A, 5B, and 4B.

FIG. 5A illustrates the configuration of an implementation example similar to that shown in FIG. 4A. FIG. 5A illustrates a state in which a foreign object 20 is positioned above the detecting coil 11b. FIG. 5B illustrates a third comparative example in which detecting signals out of phase with each other are output to two adjacent detecting coils 11a and 11b. FIG. 5C is a graph illustrating the results of measuring the inductance values in the case of the absence of foreign objects in the configurations shown in FIGS. 5A, and 5B, and 4B.

The detecting coils 11a and 11b shown in FIG. 5B are the same coils as the detecting coils 11a and 11b shown in FIG. 4A. That is, in the third comparative example, a single detecting signal output from the foreign object detecting circuit is caused to diverge and is input into the inner terminal (or the outer terminal) of the detecting coil 11a and also into the outer terminal (or the inner terminal) of the detecting coil 11b. Thus, currents out of phase with each other (reverse-phase currents) flow through the detecting coils 11a and 11b. That is, a current flows through one of the adjacent detecting coils 11a and 11b clockwise, and, at the same time, a current flows through the other one of the detecting coils 11a and 11b counterclockwise. As a result, a combined magnetic field extending over the detecting coils 11a and 11b is generated.

Factors to be considered when supplying signals or currents out of phase with each other to two detecting coils may be:

(a) whether the winding directions of wires of two detecting coils are set to be the same direction or opposite directions;

(b) whether a detecting signal is input into an outer terminal or an inner terminal of each detecting coil;

(c) whether or not a phase shifter is used if only one detecting signal is used; and (d) if two detecting signals are used, whether or not the phase difference between the two detecting signals is set to be about 180 degrees.

By considering one or a plurality of these factors, currents substantially out of phase with each other can be supplied to and flow through two detecting coils.

In each of the examples shown in FIGS. 5A and 5B, the inductance value of one of the two detecting coils 11a and 11b was measured. In the first comparative example shown in FIG. 4B, the inductance value of the detecting coil 11a was measured.

FIG. 5C shows that the inductance value in the example shown in FIG. 5A is substantially equal to that in the third comparative example shown in FIG. 5B, and both of the inductance values are about half the inductance value in the first example shown in FIG. 4B.

When the inductance of a detecting coil is changed, the frequency of a detecting signal is also changed. More specifically, as the inductance increases, the frequency decreases. In the configuration shown in FIG. 5A, the detection sensitivity to a foreign object positioned above a detecting coil is enhanced, but the detection sensitivity to a foreign object positioned above and between two adjacent detecting coils is relatively low.

Accordingly, for detecting a foreign object positioned above and between two adjacent detecting coils, the use of the configuration shown in FIG. 5B in which signals out of phase with each other are supplied to the two adjacent detecting coils is effective. By combining the configuration shown in FIG. 5A and the configuration shown in FIG. 5B, it is possible to reliably detect foreign objects positioned on a plane parallel with the coil plane. With this combined configuration, foreign objects are detected by switching between two detecting methods corresponding to the two configurations. In this case, it is desirable that the frequencies of detecting signals used for the two detecting methods be the same or be close to each other. Then, the same foreign object detecting circuit may be used for the two methods, thereby decreasing the number of components and increasing the simplicity of the foreign object detecting device.

For making the frequencies of detecting signals used for the two detecting methods approximate to each other, the inductance values of the detecting coils in the two detecting methods are desirably close to each other. As shown in FIG. 5C, the inductance value in the example shown in FIG. 5A and that in the example shown in FIG. 5B are very close to each other. Accordingly, the foreign object detecting device of the first embodiment and that shown in FIG. 5B can be suitably combined. By combining the two foreign object detecting methods in this manner, it is possible to detect foreign objects over the entire area where heat generation from a foreign object may occur, including a region above and between two adjacent detecting coils and a region above the center of each detecting coil.

The foreign object detecting device according to the first embodiment may be applicable to a wireless power transmitting apparatus or a wireless power transfer system including one or multiple power transmitting coils (for example, a large power transmitting coil or an array of power transmitting coils), which will be discussed in second and third embodiments. It is thus possible to reliably detect foreign objects before starting power transmission or while power transmission is being performed.

The foreign object detecting device including two detecting coils has been discussed. However, as described above, the foreign object detecting device may include three or more detecting coils. An example of a foreign object detecting device including four detecting coils will be described below with reference to FIG. 6.

FIG. 6 schematically illustrates a foreign object detecting device according to a first modified example of the first embodiment. The foreign object detecting device shown in FIG. 6 includes four detecting coils 11a through 11d, a foreign object detecting circuit 10a, and a switch 13. The four detecting coils 11a through 11d are aligned adjacent to each other on a single plane. Detecting signals in phase with each other are input into two adjacent detecting coils (for example, detecting coils 11a and 11b or 11b and 11c) among the four detecting coils 11a through 11d in the same direction so that currents will simultaneously flow through these two adjacent detecting coils in the same direction. For implementing this, the foreign object detecting device includes the switch 13 for switching the detecting coils to be electrically connected to the foreign object detecting circuit 10a. The switch 13 connects two adjacent detecting coils to the foreign object detecting circuit 10a and disconnects the other two detecting coils from the foreign object detecting circuit 10a. The foreign object detecting circuit 10a outputs a detecting signal S and also controls the switch 13 so that the above-described switching operation will be implemented.

FIG. 6 illustrates a state in which detecting signals are transmitted to the adjacent detecting coils 11a and 11b. The detecting signal transmitted to the detecting coil 11a is substantially in phase with (phase difference is substantially 0) that to the detecting coil 11b. It is thus possible to detect a foreign object above the detecting coil 11a or 11b with high precision. In this state, the switch 13 connects the detecting coils 11b and 11c to the foreign object detecting circuit 10a. In this case, the detecting signal transmitted to the detecting coil 11b is substantially in phase with (phase difference is substantially 0) that to the detecting coil 11c. It is thus possible to detect a foreign object above the detecting coil 11b or 11c with high precision.

In the foreign object detecting device shown in FIG. 6 in which four or more detecting coils are disposed, by using at least one switch, it is possible to detect foreign objects above the multiple detecting coils with high sensitivity and with a simple structure.

An example of a foreign object detecting device including four detecting coils has been discussed. However, a foreign object detecting device including three detecting coils and a foreign object detecting device including five or more detecting coils may be formed in a similar manner. By utilizing a coil group including three or more coils, advantages similar to those obtained by a foreign object detecting device including four detecting coils are achieved. In this configuration, each of three or more coils includes a wound wire including first and second terminals. The winding directions of at least two adjacent coils among the three or more coils from the first terminals to the second terminals are the same. The foreign object detecting circuit selects these two coils (for example, first and second coils) to which power is supplied from the coil group. For implementing this operation, the connection state of at least one switch for electrically connecting the first and second coils to the foreign object detecting circuit is controlled. The second terminals of the first and second coils are set at the same potential as the reference potential of the foreign object detecting circuit. The foreign object detecting circuit outputs a first detecting signal having a first predetermined waveform to the first terminal of the first coil and outputs a second detecting signal having a second predetermined waveform having the same polarity as the first detecting signal to the first terminal of the second coil. With this operation, the magnetic field generated from the first coil and the magnetic field generated from the second coil repel each other between the first and second coils. The foreign object detecting device measures an amount of change of the impedance value of the first coil or the second coil in the case of the presence of a foreign object. If the amount of change of exceeds a predetermined value, the foreign object detecting device determines that there is a foreign object above the first coil or the second coil.

Examples in which multiple detecting coils are linearly disposed have been discussed. However, detecting coils may be disposed two-dimensionally. In this case, advantages similar to those described above are also obtained.

Second Embodiment

Figure 7:
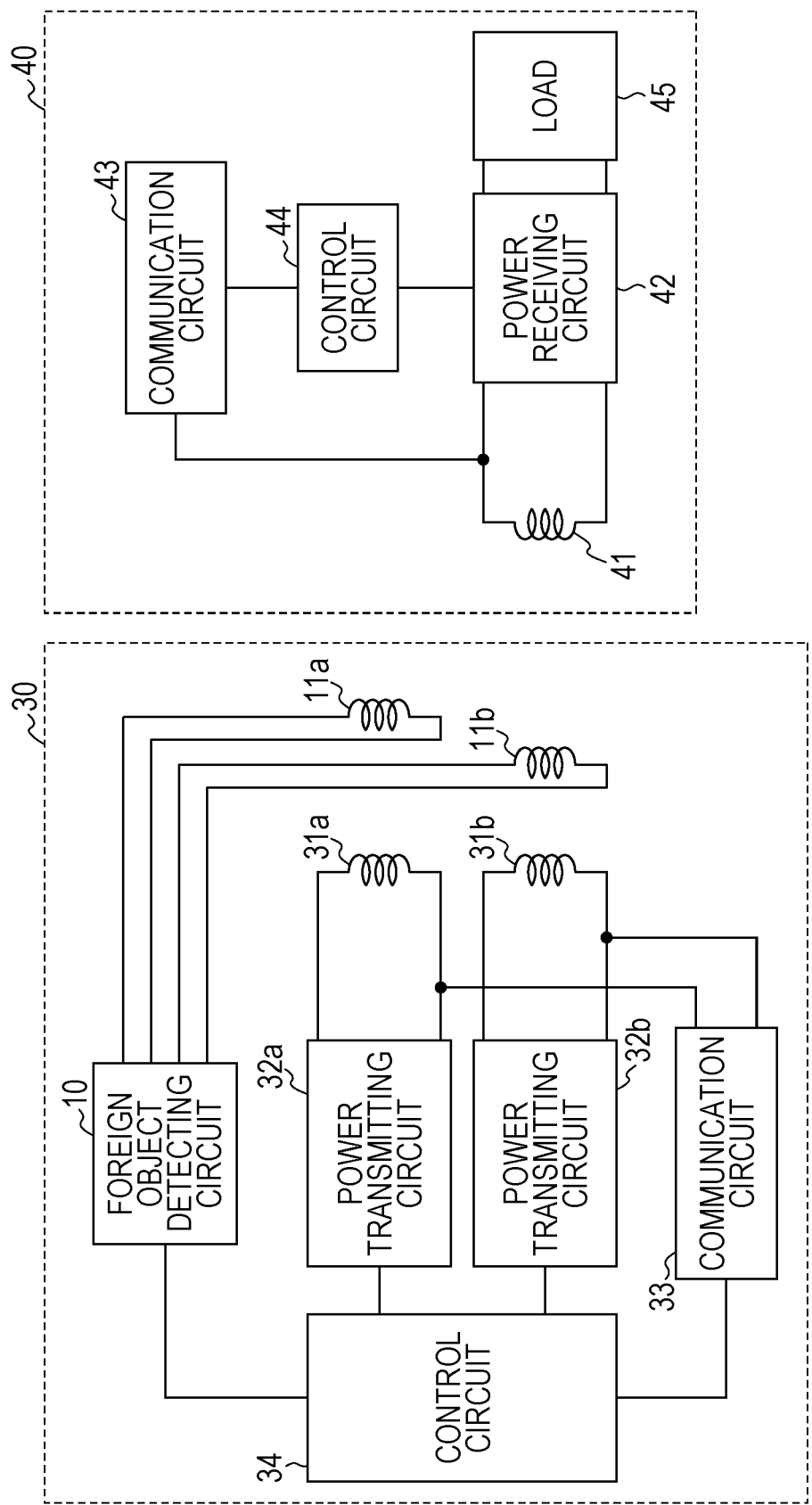
FIG. 7 is a block diagram illustrating a wireless power transfer system according to a second embodiment.

FIG. 7 is a block diagram illustrating a wireless power transfer system according to a second embodiment. The wireless power transfer system includes a power transmitting apparatus 30 and a power receiving apparatus 40. The power transmitting apparatus 30 includes a foreign object detecting circuit 10, detecting coils 11a and 11b, power transmitting coils 31a and 31b, power transmitting circuits 32a and 32b, a communication circuit 33, and a control circuit 34. The power transmitting circuits 32a and 32b are connected to the power transmitting coils 31a and 31b, respectively, and generate and output high-frequency power. The control circuit 34 of the power transmitting apparatus 30 is connected to the foreign object detecting circuit 10, the power transmitting circuits 32a and 32b, and the communication circuit 33 and controls these elements. The power receiving apparatus 40 includes a power receiving coil 41, a power receiving circuit 42, a communication circuit 43, a control circuit 44, and a load 45. The control circuit 44 of the power receiving apparatus 40 controls the power receiving circuit 42 and the communication circuit 43. The power transmitting apparatus 30 includes the foreign object detecting device 100 (foreign object detecting circuit 10 and detecting coils 11a and 11b) shown in FIG. 1, and is thus able to detect foreign objects above the power transmitting coils 31a and 31b.

The power transmitting coils 31a and 31b and the detecting coils 11a and 11b may be, for example, thin planar coils formed on a substrate, and may be formed on a substrate by using a single-layer conductor pattern or multiple-layer conductor patterns stacked on each other. Alternatively, a winding coil using copper wire, Litz wire, or twisted pair wire may be utilized.

The power transmitting circuits 32a and 32b may be full-bridge inverters or oscillator circuits, such as class D or class E oscillators. The power transmitting circuits 32a and 32b are connected to a direct current (DC) power source (not shown) and convert DC power received from the DC power source into AC power. The power transmitting circuits 32a and 32b transmit AC power to a space by using at least one of the power transmitting coils 31a and 31b.

The control circuit 34 is a processor for controlling the entire operation of the power transmitting apparatus 30. The control circuit 34 may be implemented by a combination of a central processing unit (CPU) and a memory storing a computer program therein, or by an integrated circuit, such as a microcomputer.

The foreign object detecting circuit 10 performs the operation for detecting foreign objects discussed in the first embodiment. The foreign object detecting circuit 10 may be implemented by a combination of a plurality of components, such as a microcomputer, a pulse generator, a measuring circuit, and a switch circuit. The measuring circuit measures a physical amount of change, such as the voltage, current, frequency, and inductance, in the circuit, which changes in accordance with a change in the impedance.

The communication circuit 33 communicates with the communication circuit 43 of the power receiving apparatus 40, and receives information concerning, for example, the impedance of the load 45 in the power receiving apparatus 40. This information is transmitted to the control circuit 34 and is used for controlling the transmission frequency and transmission power.

The power receiving circuit 42 may include various circuits, such as a rectifier circuit, a frequency converter circuit, a constant-voltage-and-constant-current control circuit, and a communication modulator-demodulator circuit. The power receiving circuit 42 converts received high-frequency AC power into DC power or low-frequency AC power that can be used by the load 45. Various sensors for measuring a voltage and a current output from the power receiving coil 41 may be provided.

Figure 8A:
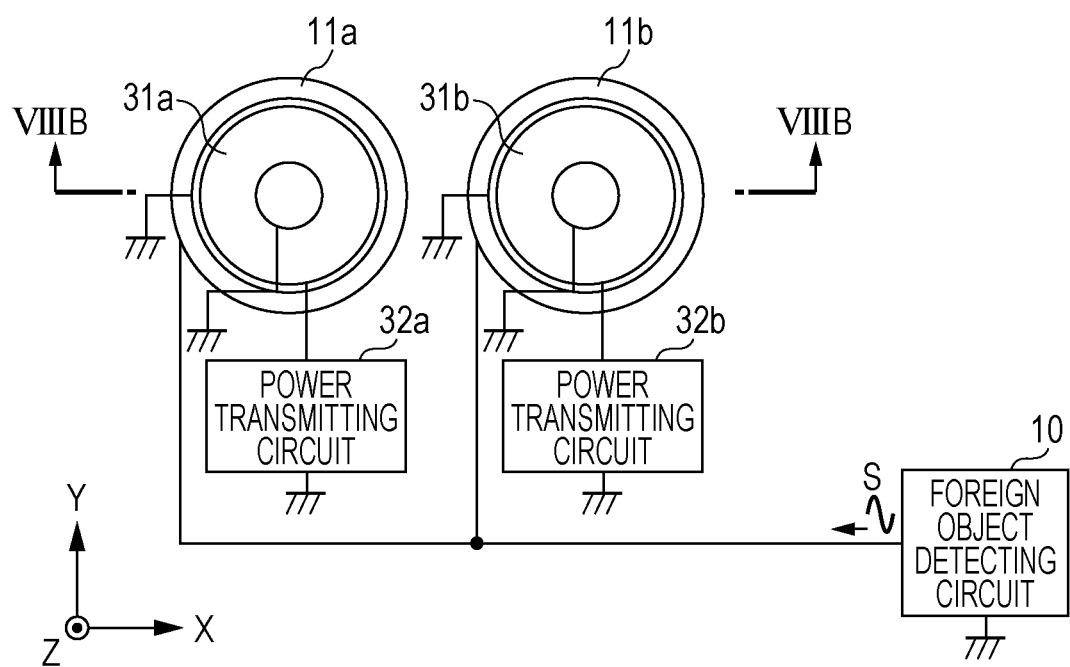
FIG. 8A schematically illustrates part of a power transmitting apparatus shown in FIG. 7.
Figure 8B:
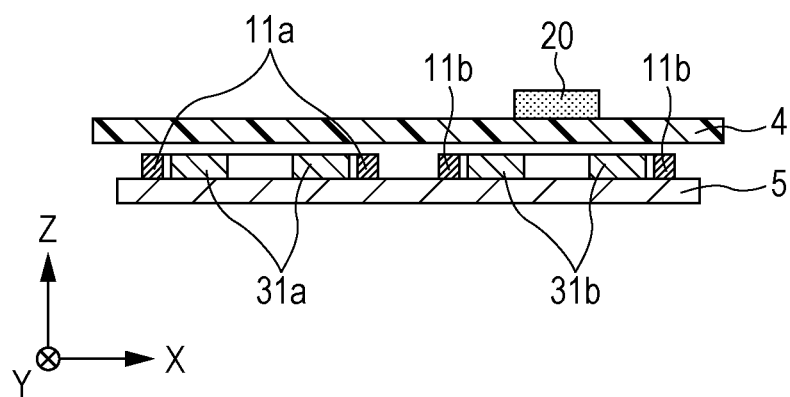
FIG. 8B is a sectional view of detecting coils and power transmitting coils taken along line VIIIB-VIIIB of FIG. 8A.

FIG. 8A schematically illustrates part of the power transmitting apparatus 30 shown in FIG. 7. FIG. 8A illustrates the positional relationship between the detecting coils 11a and 11b and the power transmitting coils 31a and 31b on the XY plane. FIG. 8B is a sectional view of the detecting coils 11a and 11b and the power transmitting coils 31a and 31b taken along line VIIIB-VIIIB of FIG. 8A. As shown in FIG. 8B, the detecting coils 11a and 11b and the power transmitting coils 31a and 31b are disposed on a magnetic substrate 5. The power transmitting apparatus 30 is disposed within a housing (cover) 4. The housing 4 is made of a material which transmits an electromagnetic field, such as plastic.

For simple representation, the magnetic substrate 5, the housing 4, and circuits other than the foreign object detecting circuit 10 and the power transmitting circuit 32a and 32b are not shown in FIG. 8A, and all the circuits within the power transmitting apparatus 30 are not shown in FIG. 8B. In the power transmitting apparatus 30, the detecting coils 11a and 11b are disposed around the outer peripheries of the power transmitting coils 31a and 31b, respectively. That is, the detecting coils 11a and 11b and the power transmitting coils 31a and 31b are provided based on a one-to-one correspondence. With this configuration, it is possible to reliably detect a foreign object 20 which may generate heat above the power transmitting coils 31a and 31b. By providing the detecting coils 11a and 11b and the power transmitting coils 31a and 31b on the same plane, the thickness of the power transmitting apparatus 30 is decreased. With the configuration shown in FIGS. 8A and 8B, by separately providing the detecting coils 11a and 11b from the power transmitting coils 31a and 31b, the foreign object 20 may be detected independently of the power transmitting operation, that is, it may be detected even during the power transmitting operation.

The frequency of the detecting signals (first detecting signal and second detecting signal) respectively input into the detecting coils 11a and 11b may be the same as or may be different from the frequency of transmission power. If the frequency of transmission power is, for example, 100 to 200 kHz, the frequency of the detecting signals may be the same as or be higher than (for example, 100 kHz to 2 MHz) the frequency of transmission power.

In the configuration shown in FIGS. 8A and 8B, the detecting coils 11a and 11b and the power transmitting coils 31a and 31b are provided on the same plane. However, this is only an example. The detecting coils 11a and 11b may be disposed above the power transmitting coils 31a and 31b, for example, between the power transmitting coils 31a and 31b and the housing 4. With this configuration, it is possible to enhance the detection sensitivity to foreign objects. Alternatively, the detecting coils 11a and 11b may be disposed under the power transmitting coils 31a and 31b, for example, between the power transmitting coils 31a and 31b and the magnetic substrate 5. With this configuration, it is possible to enhance the wireless power transfer efficiency of the power transmitting coils 31a and 31b.

FIGS. 7 through 8B show an example of the power transmitting apparatus 30 including the two power transmitting coils 31a and 31b. However, this is only an example, and the power transmitting apparatus 30 may include three or more power transmitting coils.

Figure 9A:
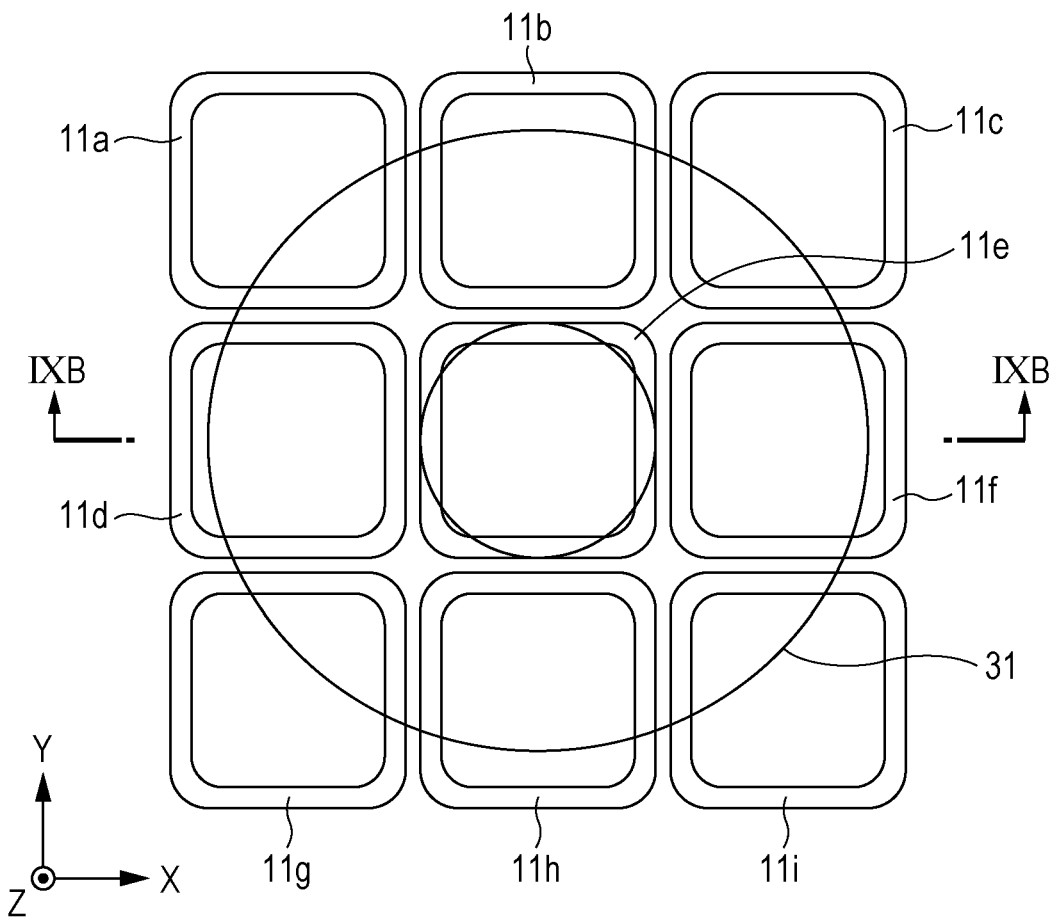
FIG. 9A illustrates the positional relationship between detecting coils and a power transmitting coil of a wireless power transfer system according to a first modified example of the second embodiment.
Figure 9B:
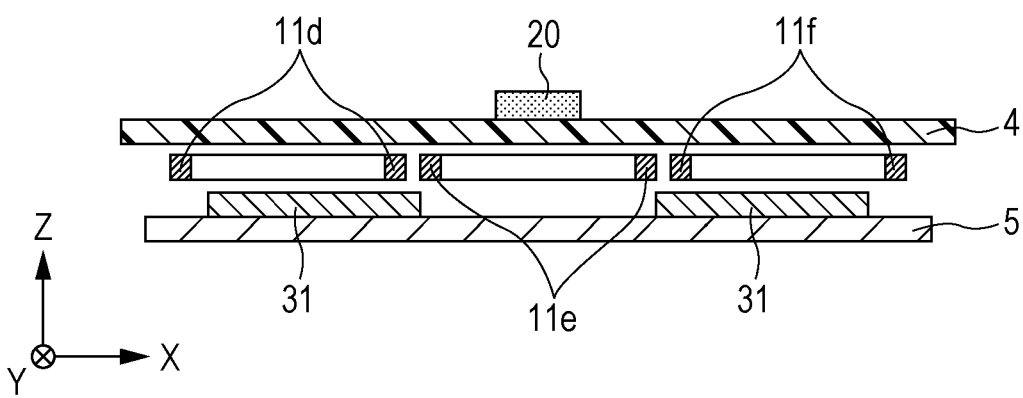
FIG. 9B is a sectional view of the detecting coils and the power transmitting coil taken along line IXB-IXB of FIG. 9A.

FIGS. 9A and 9B illustrate the disposition of detecting coils 11a through 11i and a power transmitting coil 31 of a power transmitting apparatus according to a modified example of the second embodiment. FIG. 9A illustrates the positional relationship between the detecting coils 11a through 11i and the power transmitting coil 31 on the XY plane. FIG. 9B is a sectional view of the detecting coils 11a through 11i and the power transmitting coil 31 taken along line IXB-IXB of FIG. 9A. For simple representation, the magnetic substrate 5, the housing 4, and all the circuits within the power transmitting apparatus are not shown in FIG. 9A, and all the circuits within the power transmitting apparatus are not shown in FIG. 9B.

FIGS. 9A and 9B illustrate an example in which the multiple smaller detecting coils 11a through 11i are disposed on the single large power transmitting coil 31. In this modified example, the detecting coils 11a through 11i are disposed on a single plane parallel with and above the power transmitting coil 31. By two-dimensionally disposing the multiple detecting coils 11a through 11i smaller than the power transmitting coil 31 in this manner, a small foreign object 20 can be detected with high precision. With the configuration shown in FIGS. 9A and 9B, as well as that shown in FIGS. 8A and 8B, by separately providing the detecting coils 11a through 11i from the power transmitting coil 31, the foreign object 20 may be detected independently of the power transmitting operation, that is, it may be detected even during the power transmitting operation.

In the second embodiment, the multiple detecting coils are disposed along the bottom surface of the housing 4. However, this is only an example. The multiple detecting coils may be disposed at any positions at which a magnetic field generated by the power transmitting coils passes. For example, the multiple detecting coils may be disposed at any positions on a curved plane surrounding the power transmitting coils.

As discussed above, in the power transmitting apparatus 30 according to the second embodiment, it is possible to detect foreign objects even while a power transmitting operation is being performed, and as a result, it is possible to prevent a danger that heat generation from foreign objects will occur.

Figure 10:
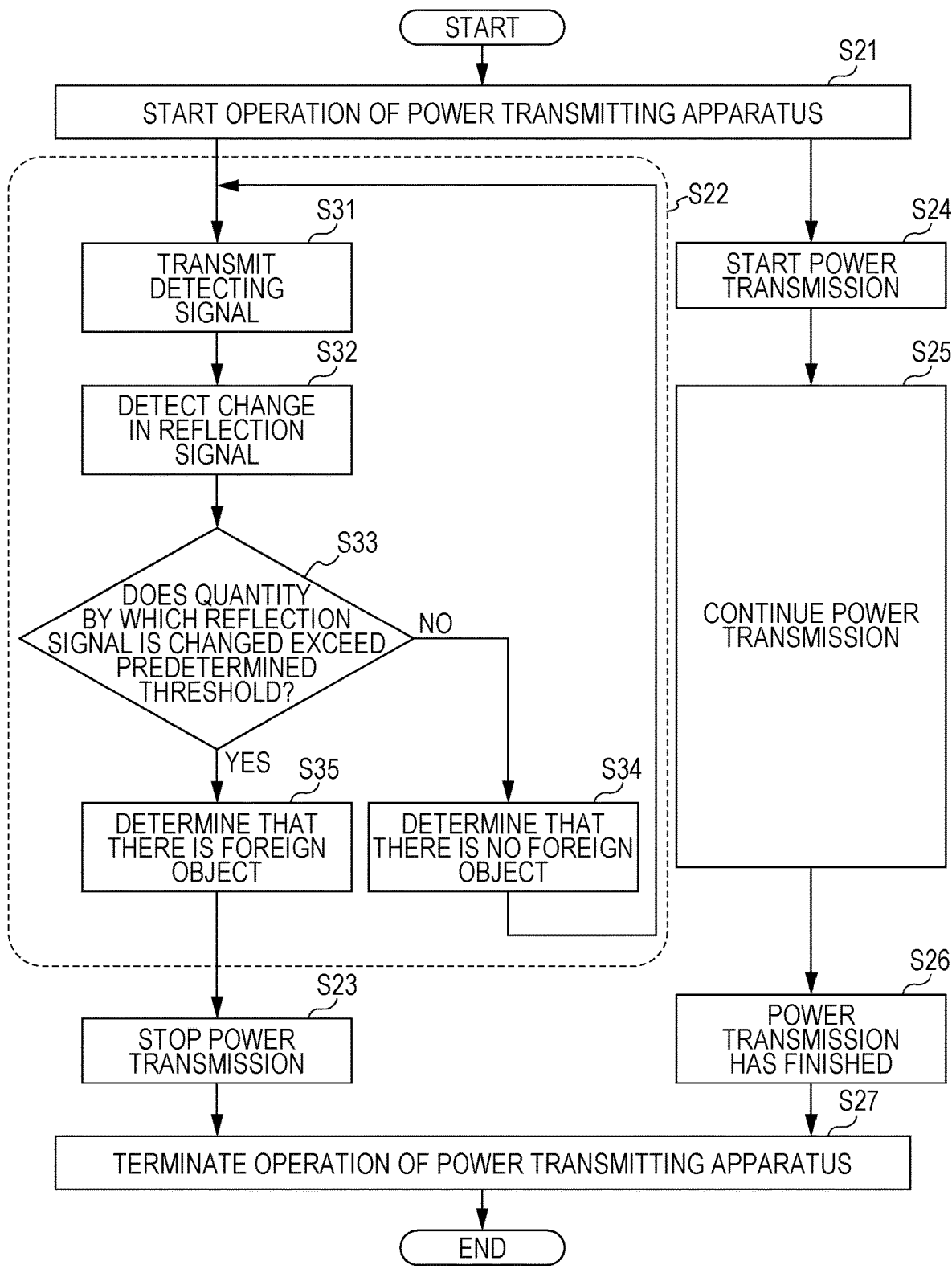
FIG. 10 is a flowchart illustrating an example of the operation of the power transmitting apparatus according to the second embodiment.

An example of the operation of the power transmitting apparatus 30 according to the second embodiment will be described below with reference to FIG. 10.

First, in step S21, the operation of the power transmitting apparatus 30 is started, for example, after the power transmitting apparatus 30 is powered ON, the power transmitting apparatus 30 (such as an IC and a memory) is initialized. Then, while power is being transmitted in steps S24 and S25, foreign object detecting processing is executed in step S22. The foreign object detecting processing in step S22 will be discussed below in detail. In step S31, the foreign object detecting circuit 10 transmits a detecting signal. Then, in step S32, the foreign object detecting circuit 10 detects a change in a reflection signal caused by the presence of a foreign object by using the method discussed in the first embodiment. Then, in step S33, the foreign object detecting circuit 10 determines whether or not the amount of change of the reflection signal exceeds a predetermined threshold. If the result of step S33 is YES, the foreign object detecting circuit 10 determines in step S35 that there is a foreign object. Then, in step S23, power transmission is stopped. In step S27, the operation of the power transmitting apparatus 30 is terminated. If the result of step S33 is NO, the foreign object detecting circuit 10 determines in step S34 that there is no foreign object. In this case, the foreign object detecting circuit 10 repeats steps S31 through S34 until it determines in step S33 that the above-described amount of change exceeds the predetermined threshold (that is, until the entry of a foreign object is detected and power transmission is stopped). However, if the power transmitting operation which is being performed together with the foreign object detecting processing is finished in step S26 and power supply to the power transmitting apparatus 30 is terminated, the operation of the power transmitting apparatus 30 is terminated in step S27. After step S34, instead of immediately returning to step S31, it may wait until a predetermined time elapses, and then, a detecting signal may be transmitted again in step S31. Then, a waste of power is avoided.

After the operation of the power transmitting apparatus 30 has been terminated in step S27, if it is determined that there is no foreign object and power transmission is restarted, the state in which the foreign object detecting circuit 10 is electrically connected to the multiple detecting coils may be switched to the state in which the power transmitting circuits are electrically connected to the power transmitting coils before restarting power transmission. Such a control operation is performed by the control circuit 34 shown in FIG. 7.

If it is determined that there is no foreign object and power transmission is restarted, power transmission may be performed by using two adjacent power transmitting coils. This makes it possible to more easily transmit power to a single large receiving coil, compared with the use of one power transmitting coil. In this case, the directions of AC power flowing through the two power transmitting coils are desirably the same.

Third Embodiment

Figure 11:
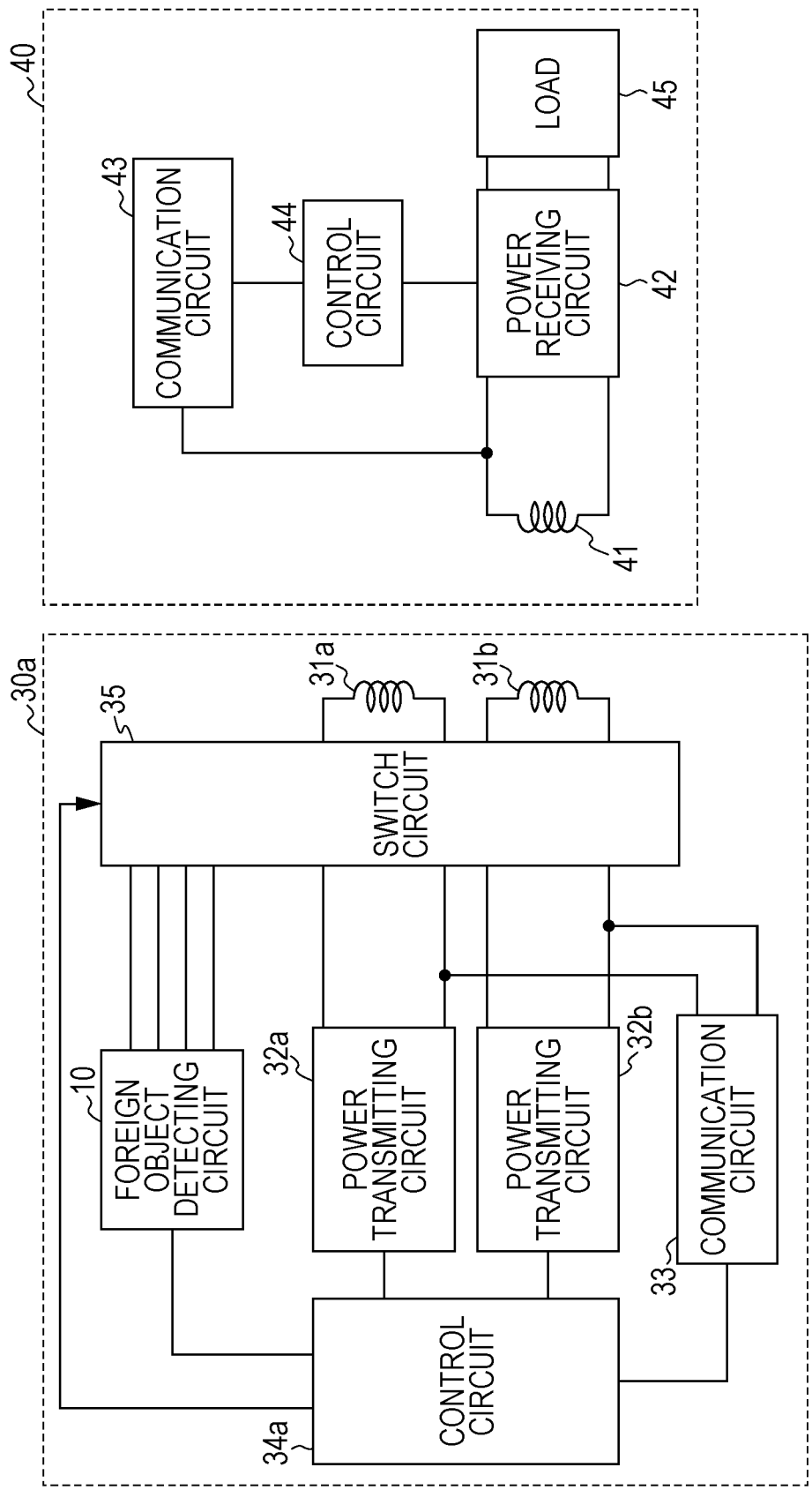
FIG. 11 is a block diagram illustrating a wireless power transfer system according to a third embodiment.

FIG. 11 is a block diagram illustrating a wireless power transfer system according to a third embodiment. The wireless power transfer system includes a power transmitting apparatus 30a and a power receiving apparatus 40. The power transmitting apparatus 30a includes a foreign object detecting circuit 10, power transmitting coils 31a and 31b, power transmitting circuits 32a and 32b, a communication circuit 33, a control circuit 34a, and a switch circuit 35. The control circuit 34a controls the foreign object detecting circuit 10, the power transmitting circuits 32a and 32b, the communication circuit 33, and the switch circuit 35. The configuration of the power receiving apparatus 40 is similar to that shown in FIG. 7.

In the power transmitting apparatus 30a, the power transmitting coils 31a and 31b also serve as the detecting coils 11a and 11b shown in FIG. 7. That is, the power transmitting coils 31a and 31b are used for both purposes of power transmission and detection of foreign objects. The switch circuit 35 connects at least one of the power transmitting circuits 32a and 32b to at least one of the power transmitting coils 31a and 31b or connects the foreign object detecting circuit 10 to the two power transmitting coils 31a and 31b.

When at least one of the power transmitting circuits 32a and 32b is connected to at least one of the power transmitting coils 31a and 31b, the power transmitting apparatus 30a is able to transmit power to the power receiving apparatus 40. When the foreign object detecting circuit 10 is connected to the power transmitting coils 31a and 31b, the power transmitting apparatus 30a is able to detect foreign objects above the power transmitting coils 31a and 31b. With this configuration, the provision of the detecting coils 11a and 11b shown in FIG. 7 can be omitted, thereby decreasing the number of components and thus reducing the cost. Additionally, since the power transmitting coils 31a and 31b, which are relatively large components, can be used for both purposes of power transmission and detection of foreign objects, the size, weight, and thickness of the power transmitting apparatus 30a can be reduced. As a result, the designing flexibility of the power transmitting apparatus 30a is increased.

Figure 12:
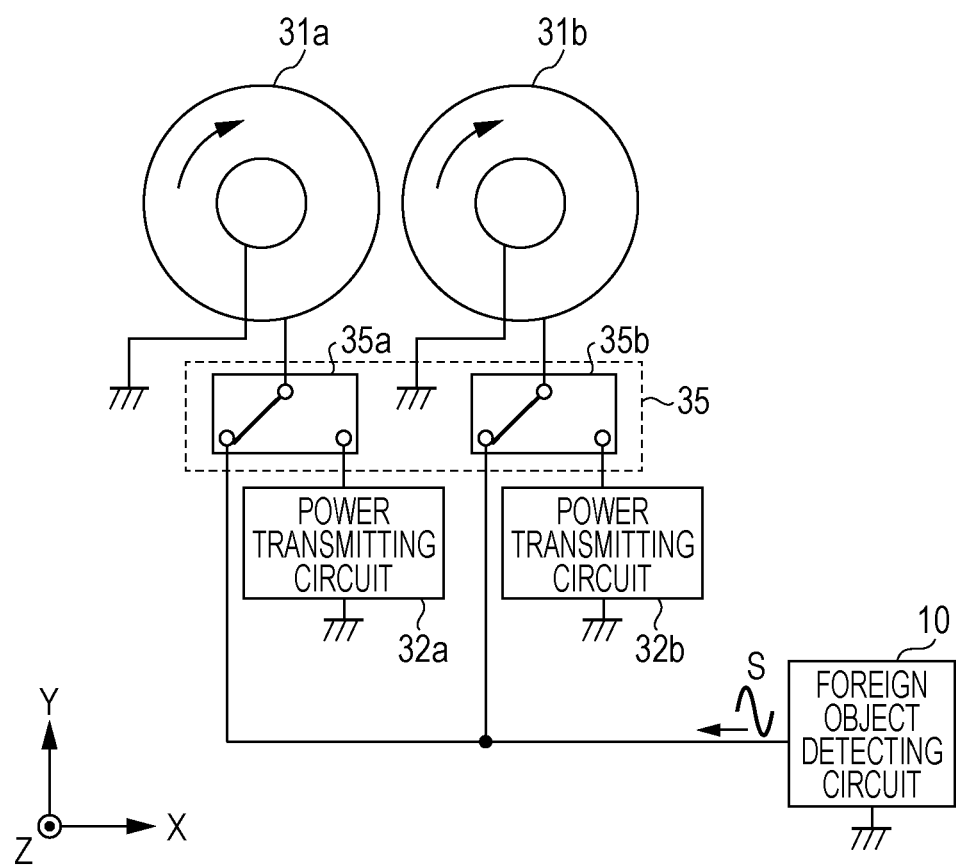
FIG. 12 schematically illustrates part of a power transmitting apparatus shown in FIG. 11.

FIG. 12 schematically illustrates part of the power transmitting apparatus 30a shown in FIG. 11. FIG. 12 illustrates the positional relationship between the power transmitting coils 31a and 31b on the XY plane. For simple representation, in FIG. 12, the components other than the power transmitting coils 31a and 31b, the power transmitting circuit 32a and 32b, the switch circuit 35, and the foreign object detecting circuit 10 are not shown. The two power transmitting coils 31a and 31b have windings being wound in the same direction on a single plane, and are disposed adjacent to each other. The foreign object detecting circuit 10 generates and outputs a detecting signal S having a predetermined waveform. The detecting signal S branches off as two first and second detecting signals, which are input into the outer terminals of the power transmitting coils 31a and 31b via the switch circuit 35.

In response to the detecting signal S transmitted from the foreign object detecting circuit 10, currents flow through the two power transmitting coils 31a and 31b in the same direction. Then, a combined magnetic field similar to that shown in FIG. 2 is formed, thereby making it possible to detect foreign objects above the power transmitting coils 31a and 31b. The switch circuit 35 includes switches 35a and 35b. When performing detection of foreign objects, the switch 35a connects the power transmitting coil 31a to the foreign object detecting circuit 10. When performing power transmission, the switch 35a connects the power transmitting coil 31a to the power transmitting circuit 32a. Similarly, when performing detection of foreign objects, the switch 35b connects the power transmitting coil 31b to the foreign object detecting circuit 10, and when performing power transmission, the switch 35b connects the power transmitting coil 31b to the power transmitting circuit 32b. These switching operations are performed by the control circuit 34a shown in FIG. 11. With this configuration, the power transmitting coils 31a and 31b can be used for both purposes of power transmission and detection of foreign objects. Accordingly, in the configuration shown in FIGS. 11 and 12, a detecting coil and a power transmitting coil may be constituted by a single component. It is thus possible to reduce the manufacturing cost of the power transmitting apparatus and the wireless power transfer system.

Figure 13:
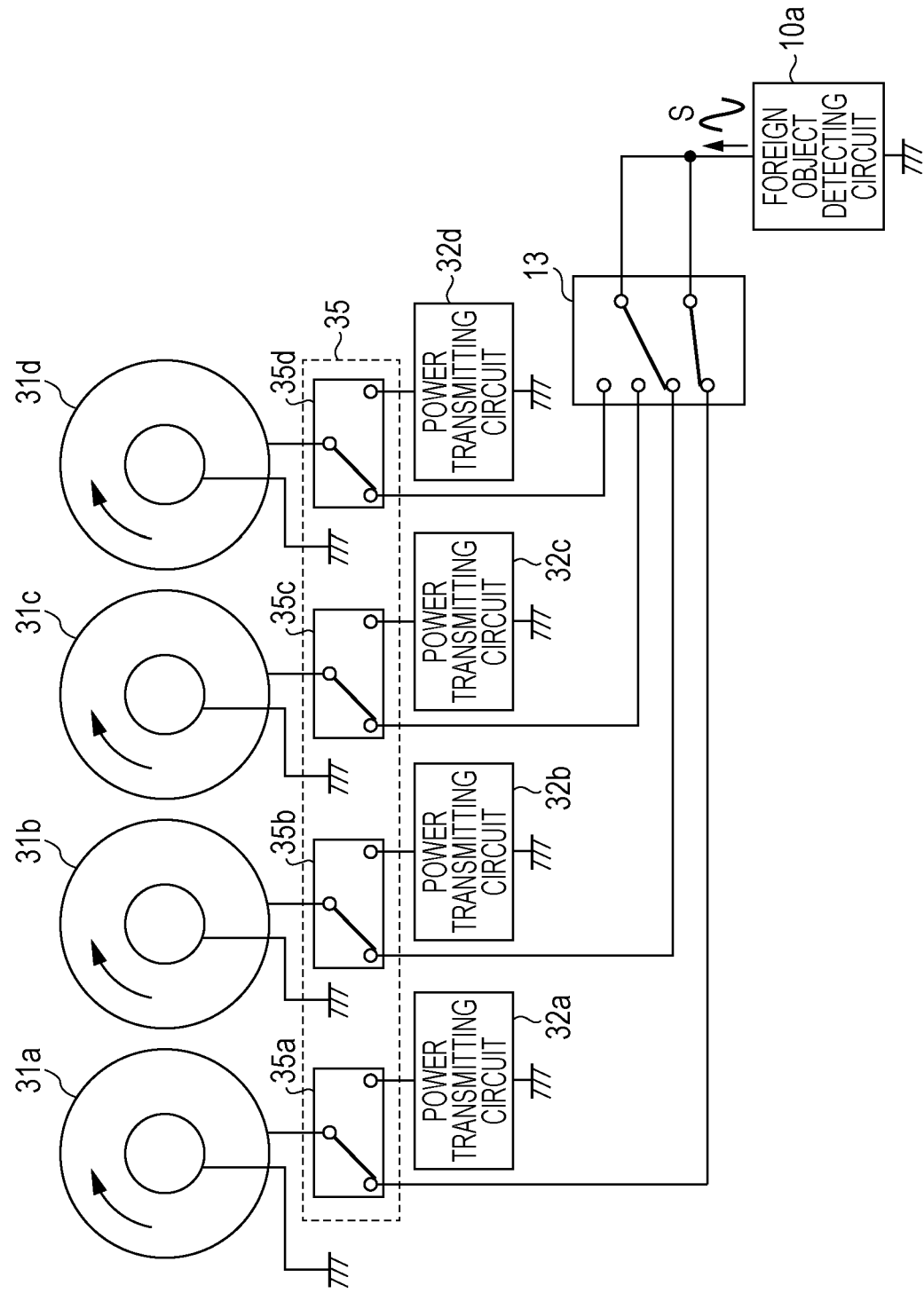
FIG. 13 schematically illustrates part of a power transmitting apparatus of a wireless power transfer system according to a first modified example of the third embodiment.

FIG. 13 schematically illustrates part of a power transmitting apparatus of a wireless power transfer system according to a first modified example of the third embodiment. The configuration shown in FIG. 13 corresponds to that using four detecting coils shown in FIG. 6. The power transmitting apparatus includes four power transmitting coils 31a through 31d having wires being wound in the same direction on a single plane. The configuration of the foreign object detecting circuit 10a is similar to that of the foreign object detecting circuit 10a shown in FIG. 6. When performing detection of foreign objects, two adjacent power transmitting coils (for example, the power transmitting coils 31a and 31b) are connected to the foreign object detecting circuit 10a via the switch 13. The operation for detecting foreign objects in the first modified example is similar to that discussed with reference to FIG. 6. The configuration in which the power transmitting coils 31a through 31d are switched between detection of foreign objects and power transmission is similar to that in FIG. 12. With the configuration shown in FIG. 13, a detecting coil and a power transmitting coil may be constituted by a single component. It is thus possible to reduce the manufacturing cost of the power transmitting apparatus and the wireless power transfer system.

Figure 14:
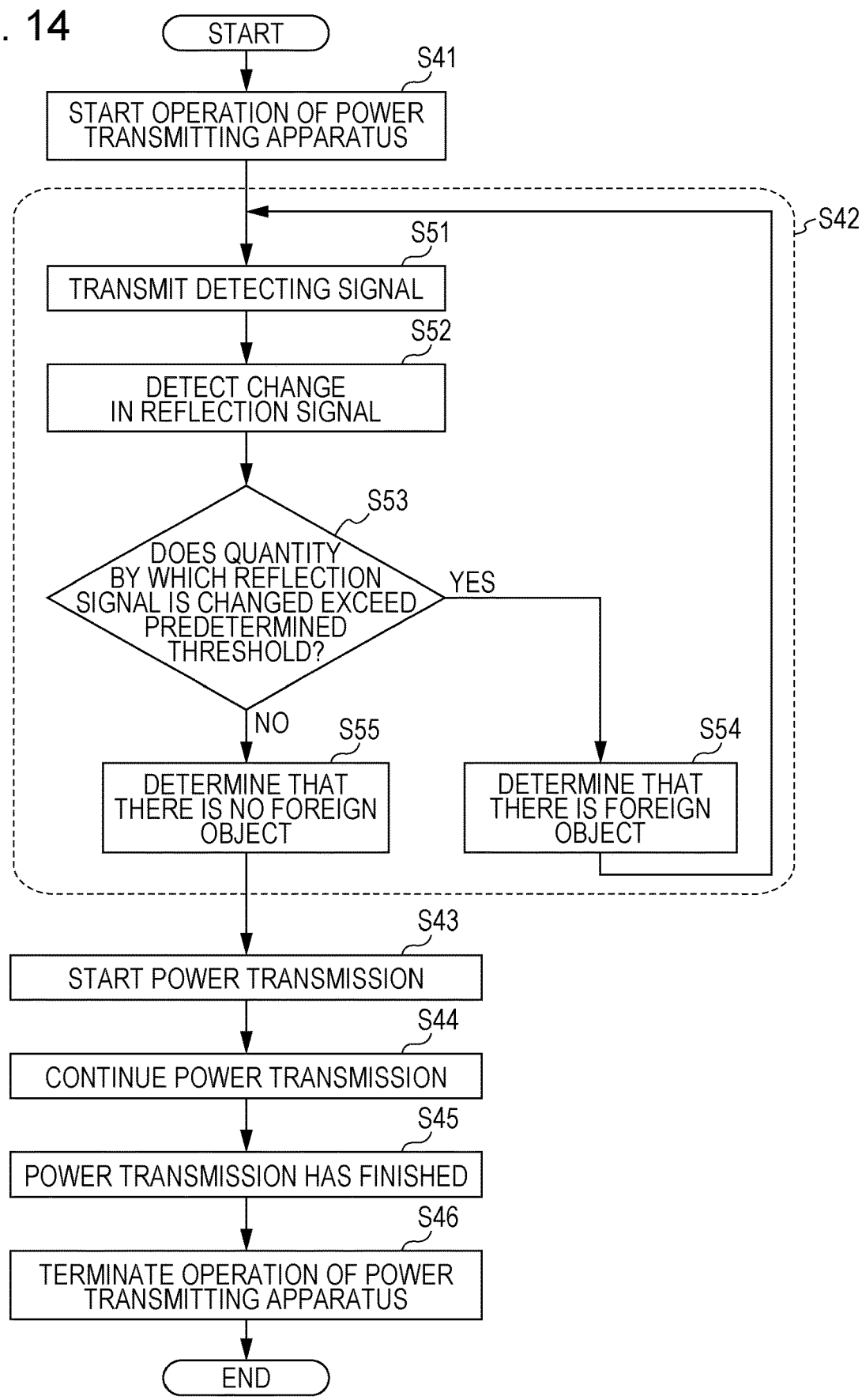
FIG. 14 is a flowchart illustrating an example of the operation of the power transmitting apparatuses according to the second and third embodiments.

In the power transmitting apparatuses according to the second and third embodiments, by detecting foreign objects by using the foreign object detecting device according to an embodiment of the present disclosure, the danger that heat generation from foreign objects will occur can be prevented. An example of the operation of the power transmitting apparatus will be described below with reference to FIG. 14.

First, in step S41, the operation of the power transmitting apparatus is started. Then, foreign object detecting processing is executed in step S42 similarly to the foreign object detecting processing S2 shown in FIG. 3.

The foreign object detecting processing in step S42 will be discussed below in detail. In step S51, the foreign object detecting circuit 10 transmits a detecting signal to two coils. Then, in step S52, the foreign object detecting circuit 10 detects a change in a reflection signal caused by the presence of a foreign object by using the method discussed in the first embodiment. Then, in step S53, the foreign object detecting circuit 10 determines whether or not the amount of change of the reflection signal exceeds a predetermined threshold.

If the result of step S53 is NO, the foreign object detecting circuit 10 determines in step S55 that there is no foreign object. Then, power transmission is started in step S43 and continues in step S44 until power transmission is finished in step S45 and the operation of the power transmitting apparatus is terminated in step S46. If the result of step S53 is YES, the foreign object detecting circuit 10 determines in step S54 that there is a foreign object. In this case, the foreign object detecting circuit 10 repeats steps S51 through S54 until it determines in step S53 that the above-described amount of change does not exceed the predetermined threshold, that is, it determines in step S55 that there is no foreign object. However, if, for example, power supply to the power transmitting apparatus is stopped during power transmission, the operation of the power transmitting apparatus is terminated.

After continuously performing foreign object detecting processing in step S42 until a predetermined time elapses, if a foreign object is still detected, power supply to the power transmitting apparatus may be stopped. Then, a waste of power is avoided.

As described above, by detecting foreign objects before starting power transmission by using a power transmitting apparatus including a foreign object detecting circuit, it is possible to prevent the danger that heat generation from foreign objects will occur.

In the power transmitting apparatus, foreign object detecting processing may be executed before starting power transmission, and may also be executed while power is being transmitted. In this manner, it is possible to more reliably prevent the danger that heat generation from foreign objects will occur. An example of such an operation will be described below with reference to FIG. 15.

Figure 15:
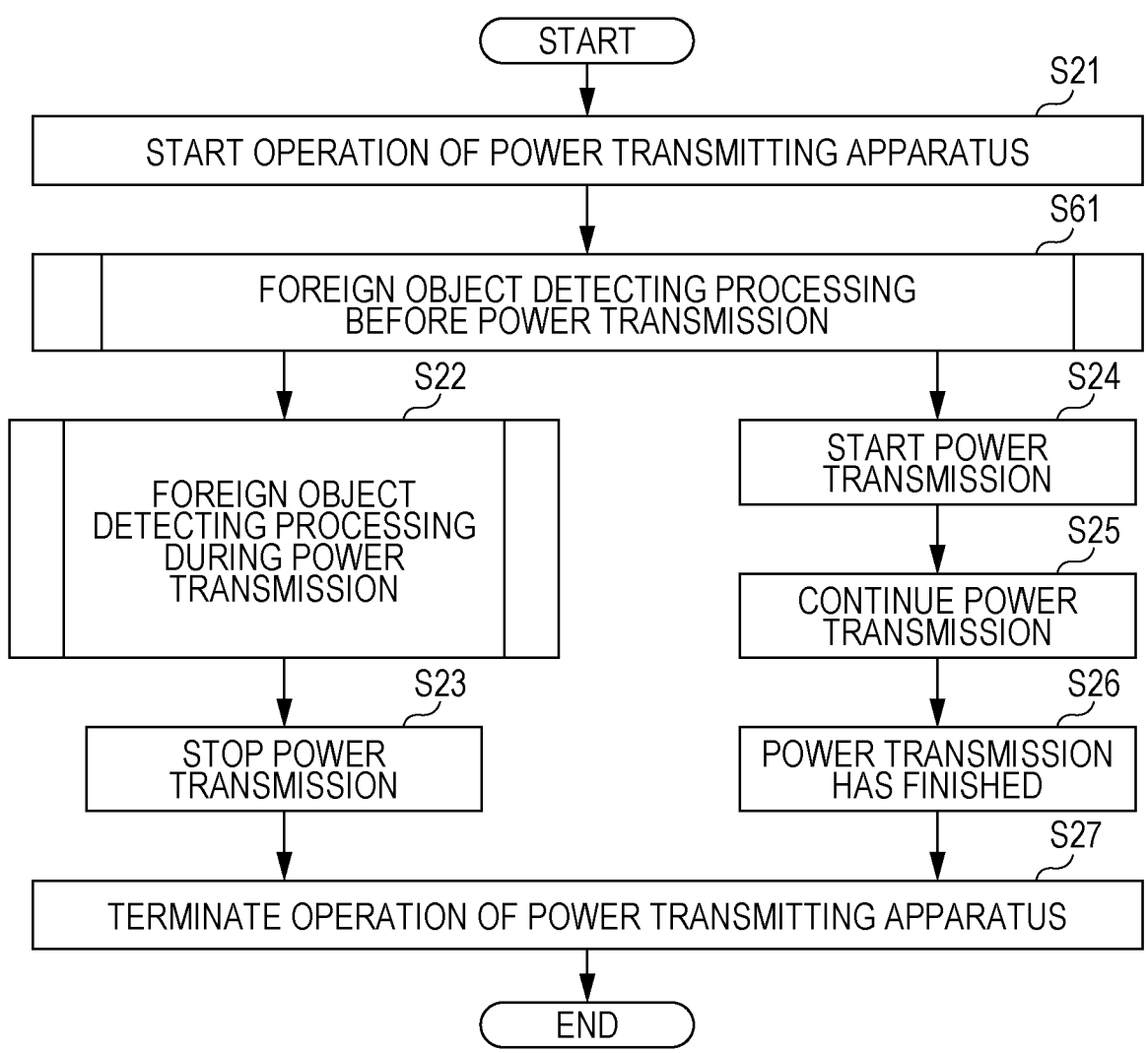
FIG. 15 is a flowchart illustrating an example of the operation of the power transmitting apparatuses according to the second and third embodiments which perform detection of foreign objects before starting power transmission and while power transmission is being performed.

After starting the operation of the power transmitting apparatus in step S21, foreign object detecting processing is executed in step S61 (similar to step S42 of FIG. 14) before starting power transmission. After it is determined that there is no foreign object, power transmission is started in step S24, and at the same time, foreign object detecting processing 322 (similar to step S22 of FIG. 10) is executed while performing power transmission. Steps S21 through S27 in FIG. 15 are respectively similar to steps S21 through S27 in FIG. 10. Step S61 of FIG. 15 is similar to step S42 of FIG. 14. Thus, an explanation of steps S21 through S27 and S61 will be omitted.

In the power transmitting processing shown in FIG. 15, it is possible to detect foreign objects before starting power transmission and also to detect the entry of foreign objects even during power transmission and to stop transmitting power, thereby further enhancing the safety.

Other Modified Examples

In the above-described embodiments, the detecting coils and power transmitting coils are formed in a generally circular or quadrilateral shape. Alternatively, the detecting coils and power transmitting coils may be formed in another shape, for example, a generally square, rectangular, elliptical, or oval shape.

In the second and third embodiments, the power transmitting apparatus 30 or 30a and the power receiving apparatus 40 include the communication circuits 33 and 43, respectively. However, this is only an example. One of the power transmitting apparatus and the power receiving apparatus may include a transmitting circuit, and the other one of the power transmitting apparatus and the power receiving apparatus may include a receiving circuit, in which case, simplex communication may be performed. This simplifies the circuit configuration and therefore reduces the cost. If the level of power to be transmitted and received is fixed, communication is not required, in which case, the provision of communication circuits may be omitted, thereby further reducing the cost.

In the second and third embodiments, in the power transmitting apparatuses 30 and 30a, the communication circuit 33 is connected to the power transmitting coils 31a and 31b and performs communication by using them. However, this is only an example. The communication circuit 33 may be connected to a separate antenna or another coil. Similarly, in the power receiving apparatus 40, the communication circuit 43 performs communication by using the power receiving coil 41. However, this is only an example. The communication circuit 43 may be connected to a separate antenna or another coil.

In the second and third embodiments, the power transmitting circuits 32a and 32b are connected to the power transmitting coils 31a and 31b, respectively. However, this is only an example. One power transmitting circuit may be connected to all the power transmitting coils 31a and 31b. This makes it possible to reduce the number of power transmitting circuits, which leads to a reduction in the cost. Alternatively, one power transmitting circuit may be selectively connected to one of the power transmitting coils 31a and 31b via a switch. This makes it possible to transmit power only to a power transmitting coil which requires power transmission, thereby reducing a waste of energy and thus improving the power transfer efficiency.

In the second and third embodiments, the area of the magnetic substrate 5 is larger than the region where the detecting coils 11a and 11b and the power transmitting coils 31a and 31b (only the power transmitting coils 31a and 31b in the third embodiment) are disposed. With this configuration, it is possible to reduce the influence of, for example, a metal (for example, a top plate of a metallic table) disposed under the detecting coils 11a and 11b and the power transmitting coils 31a and 31b on the detecting coils 11a and 11b and the power transmitting coils 31a and 31b. In the second embodiment shown in FIGS. 8A and 8B, the single large magnetic substrate 5 is used. However, this is only an example. A separate magnetic substrate may be provided for each set of a power transmitting coil and a detecting coil. With this disposition, it is not necessary to provide a magnetic body in areas on which a power transmitting coil and a detecting coil are not disposed and thus to reduce the cost of components.

Other Embodiments

The technology of the present disclosure is not restricted to the above-described embodiments and modified examples, and various other modifications may be made. A description will be given below of other embodiments of a wireless power transmitting apparatus including one of the above-described foreign object detecting devices and a wireless power transfer system including a wireless power transmitting apparatus and a wireless power receiving apparatus.

Figure 16:
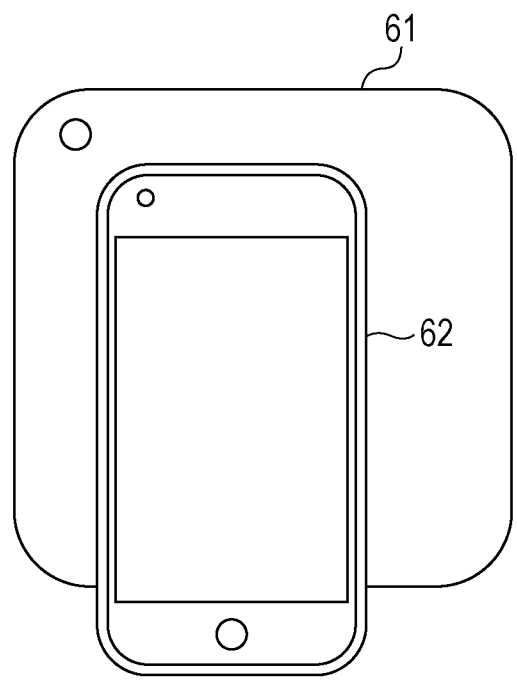
FIG. 16 illustrates a state in which a smartphone including a power receiving apparatus is disposed on a power transmitting apparatus.

FIG. 16 illustrates a state in which a smartphone 62 including a power receiving apparatus is disposed on a power transmitting apparatus 61. The power transmitting apparatus 61 includes one of the above-described foreign object detecting devices. Before starting power transmission, the foreign object detecting device determines whether or not there is a foreign object on the power transmitting apparatus 61. If it is determined that there is no foreign object, a power transmitting circuit within the power transmitting apparatus 61 wirelessly transmits AC power to the power receiving apparatus within the smartphone 62. The power transmitting apparatus 61 and the power receiving apparatus within the smartphone 62 form a wireless power transfer system.

In this wireless power transfer system, since the foreign object detecting device performs detection of foreign objects before the power transmitting apparatus 61 starts power transmission, it is possible to prevent the danger that heat generation from foreign objects will occur.

If the power transmitting apparatus 61 performs detection of foreign objects by using the foreign object detecting device even during power transmission, it is possible to more reliably prevent the danger that heat generation from foreign objects will occur.

Figure 17:
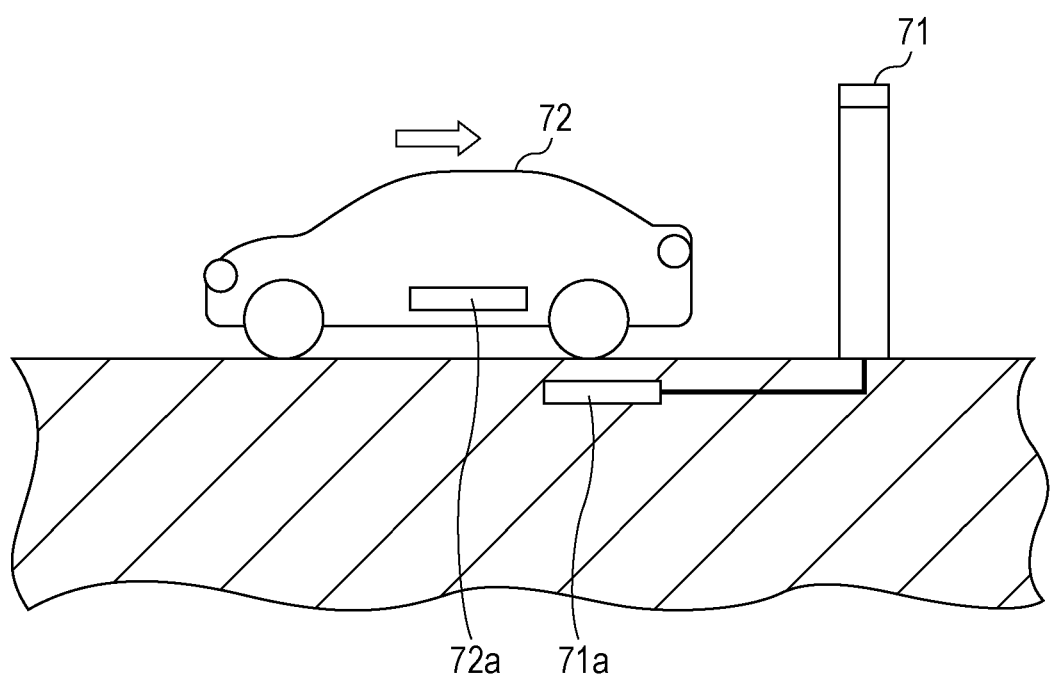
FIG. 17 illustrates a car park equipped with a wireless power transfer system.

FIG. 17 illustrates a car park equipped with a wireless power transfer system. A vehicle 72 includes a power receiving apparatus having a power receiving coil 72a. A power transmitting apparatus 71 is provided in a fence, that is, a car stopper, which is substantially erected on a road. The power transmitting apparatus 71 includes one of the above-described foreign object detecting devices. A power transmitting coil 71a is embedded in the road and is connected to the power transmitting apparatus 71 by using an electric cable.

Before the power transmitting apparatus 71 starts power transmission, the foreign object detecting device determines whether or not there is a foreign object on the power transmitting coil 71a. If it is determined that there is no foreign object on the power transmitting coil 71a and that the position of the power receiving coil 72a within the vehicle 72 is adjusted to that of the power transmitting coil 71a, high-frequency power is transmitted from the power transmitting apparatus 71 to the power transmitting coil 71a via the electric cable, and is further transmitted wirelessly to the power receiving coil 72a.

In this wireless power transfer system, since the foreign object detecting device performs detection of foreign objects before the power transmitting apparatus 71 starts power transmission, it is possible to prevent the danger that heat generation from foreign objects will occur.

If the power transmitting apparatus 71 performs detection of foreign objects by using the foreign object detecting device even during power transmission, it is possible to more reliably prevent the danger that heat generation from foreign objects will occur.

Figure 18:
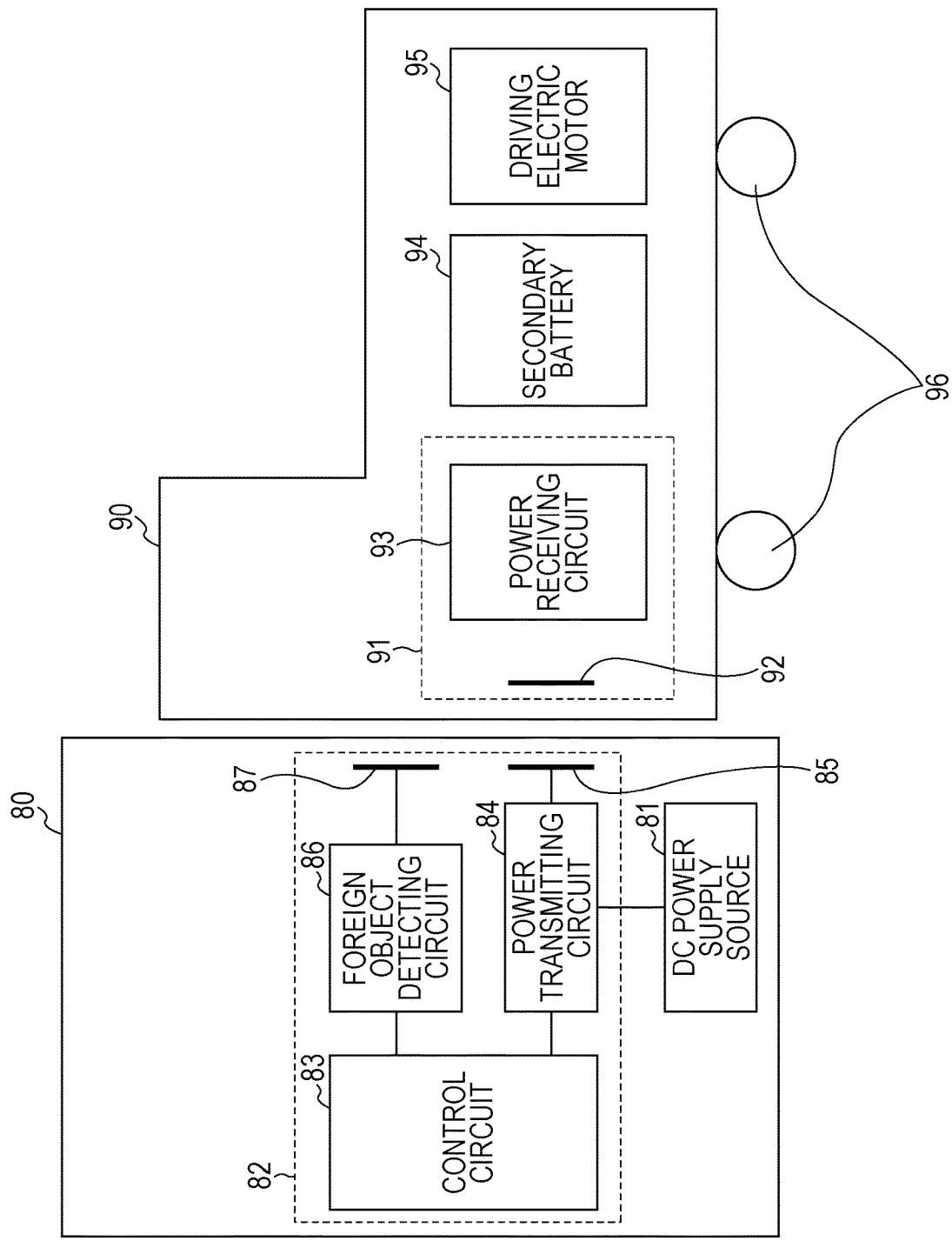
FIG. 18 illustrates an example of the configuration of a wireless power transfer system that transfers power from a wall to a robot in a non-contact manner.

FIG. 18 illustrates an example of the configuration of a wireless power transfer system that transfers power from a wall 80 to a robot 90 used in, for example, a hospital, in a non-contact manner. In this example, a DC power supply source 81 and a power transmitting apparatus 82 are embedded in the wall 80. The power transmitting apparatus 82 includes a control circuit 83, a power transmitting circuit 84, a power transmitting coil 85, a foreign object detecting circuit 86, and a detecting coil 87. The power transmitting apparatus 82 may be configured similarly to the power transmitting apparatus 30 shown in FIG. 7. The robot 90 is equipped with a power receiving apparatus 91 including a power receiving coil 92 and a power receiving circuit 93. The power receiving apparatus 91 may be similarly configured to the power receiving apparatus 40 shown in FIG. 7. The robot 90 also includes a secondary battery 94, a driving electric motor 95, and multiple moving wheels 96.

In this wireless power transfer system, by transferring power from the wall 80 to the robot 90 in, for example, a hospital, in a non-contact manner, the robot 90 can be charged automatically without the need of human aid.

In this wireless power transfer system, since the foreign object detecting device performs detection of foreign objects before the power transmitting apparatus 82 starts power transmission, it is possible to prevent the danger that heat generation from foreign objects will occur.

If the power transmitting apparatus 82 performs detection of foreign objects by using the foreign object detecting device even during power transmission, it is possible to more reliably prevent the danger that heat generation from foreign objects will occur.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

The present disclosure encompasses foreign object detecting devices, wireless power transmitting apparatuses, and wireless power transfer systems described in the following items.

[Item 1]

A foreign object detecting device including:

a first coil that includes a first wound wire having first and second terminals;

a second coil that includes a second wound wire having third and fourth terminals and is disposed adjacent to the first coil, a winding direction of the second wound wire from the third terminal to the fourth terminal being the same as a winding direction of the first wound wire from the first terminal to the second terminal; and one foreign object detecting circuit operative to:

output first detecting signal having a first predetermined waveform to the first terminal of the first coil and output a second detecting signal having a second predetermined waveform to the third terminal of the second coil to cause a first magnetic field generated from the first coil and a second magnetic field generated from the second coil to repel each other, a polarity of the second predetermined waveform being the same as a polarity of the first predetermined waveform, the repelled first and the second magnetic field being disposed between the first and second coils;

measure an amount of change of an impedance value with respect to one of the first and second coils which is caused by the presence of a foreign object; and determine that a foreign object above the first coil or the second coil is present if the amount of change exceeds a predetermined value, wherein potential of each of the second and fourth terminals is at the same potential as reference potential of the foreign object detecting circuit.

According to the above-described aspect, the foreign object detecting device includes a first coil, a second coil, and a foreign object detecting circuit. The first coil includes a first wound wire having first and second terminals. The second coil includes a second wound wire having third and fourth terminals and is disposed adjacent to the first coil. The winding direction of the second wound wire from the third terminal to the fourth terminal is the same as a winding direction of the first wound wire from the first terminal to the second terminal.

The foreign object detecting circuit outputs a first detecting signal having a first predetermined waveform to the first terminal of the first coil and also outputs a second detecting signal having a second predetermined waveform to the third terminal of the second coil to cause a magnetic field generated from the first coil and a magnetic field generated from the second coil to repel each other between the first and second coils. The polarity of the second predetermined waveform is the same as a polarity of the first predetermined waveform. With this operation, it is possible to intensify a magnetic field above the first and second coils.

The foreign object detecting circuit measures an amount of change of an impedance value with respect to one of the first and second coils in the case of the presence of a foreign object. The foreign object detecting circuit determines that there is a foreign object above the first coil or the second coil if the amount of change exceeds a predetermined value.

With this configuration, not only the range in which foreign objects can be detected is increased by disposing multiple coils, but also a foreign object above a first coil or a second coil can be detected with high precision by intensifying the magnetic field above the first and second coils.

As a result, it is possible to increase the range (in particular, the range in the height direction) in which foreign objects can be detected with high precision.

Additionally, general-purpose detecting coils may be safely used, thereby suppressing an increase in the number of components, dimensions, and manufacturing cost of the foreign object detecting device.

[Item 2]

The foreign object detecting device according to item 1, wherein:

each of the first and third terminals is one of an outer terminal disposed on an outer side of a corresponding one of the first and second coils and an inner terminal disposed on an inner side of a corresponding one of the first and second coils; and each of the second and fourth terminals is the other one of the outer terminal and the inner terminal of a corresponding one of the first and second coils.

[Item 3]

The foreign object detecting device according to item 1 or 2, wherein each of the first and second coils is disposed in a direction perpendicular to an axis of a corresponding one of the first and second coils.

According to the above-described aspect, since the first and second coils are aligned in a direction perpendicular to their axes, the distributions of magnetic fields generated from the first and second coils become uniform, thereby making it possible to detect foreign objects with high precision.

[Item 4]

The foreign object detecting device according to one of items 1 to 3, wherein the first and second detecting signals are alternating current signals or pulse signals.

The use of AC signals as the first and second detecting signals is suitable in a situation where the entry of foreign objects is relatively frequent and for the foreign object detecting device is used for long hours. Power of an AC signal gradually changes. Thus, if the foreign object detecting device is used continuously for long hours, it is possible to reduce the burden on the first and second coils. On the other hand, the use of pulse signals as the first and second detecting signals is suitable in a situation where the entry of foreign objects is relatively less frequent. By the use of a pulse signal, an intermittent signal is likely to be produced, thereby making it possible to perform detection of foreign objects while power consumption is being reduced.

[Item 5]

The foreign object detecting device according to one of items 1 to 4, wherein the foreign object detecting circuit simultaneously outputs the first and second detecting signals to the first and second coils, respectively.

According to the above-described aspect, since there is no phase difference between the first and second detecting signals, the distributions of magnetic fields generated from the first and second coils become uniform, thereby making it possible to detect foreign objects with high precision.

[Item 6]

A wireless power transmitting apparatus including:

the foreign object detecting device according to one of items 1 to 5;

a power transmitting coil; and a power transmitting circuit that transmits high-frequency power to the power transmitting coil.

According to the above-described aspect, the wireless power transmitting apparatus includes the foreign object detecting device according to an embodiment of the present disclosure that is able to increase the range in which foreign objects can be detected with high precision. It is thus possible to increase the range in which the power transmitting circuit is able to transmit high-frequency power.

Additionally, if the first and second coils and the power transmitting coil are different coils, the detection of the entry of foreign objects can be performed even while high-frequency power is being transmitted. It is thus possible to prevent the danger that heat generation will occur due to the presence of foreign objects.

[Item 7]

The wireless power transmitting apparatus according to item 6, further including:

a housing within which the power transmitting coil is disposed, wherein an outer periphery of each of the first and second coils is smaller than an outer periphery of the power transmitting coil, and the first and second coils are disposed between a main surface of the housing and the power transmitting coil.

According to the above-described aspect, since the outer periphery of each of the first and second coils is smaller than that of the power transmitting coil, it is possible to detect foreign objects smaller than the power transmitting coil.

[Item 8]

The wireless power transmitting apparatus according to item 6, wherein the power transmitting coil and at least one of the first and second coils are the same component.

According to the above-described aspect, it is possible to reduce the cost and also to decrease the weight and the thickness of the wireless power transmitting apparatus.

[Item 9]

The wireless power transmitting apparatus according to one of items 6 to 8, wherein power of the first detecting signal and power of the second detecting signal are lower than the high-frequency power.

[Item 10]

The wireless power transmitting apparatus according to one of items 6 to 9, further including:

a control circuit that causes the power transmitting circuit to transmit the high-frequency power after it is determined by the foreign object detecting circuit that there is no foreign object above the first coil or the second coil.

According to the above-described aspect, after it is determined by the foreign object detecting circuit that there is no foreign object within a magnetic field formed by the first and second coils, the power transmitting circuit is caused to transmit high-frequency power, thereby enhancing the safety.

[Item 11]

A wireless power transfer system including:

the wireless power transmitting apparatus according to one of items 6 to 10; and a wireless power receiving apparatus.

[Item 12]

A foreign object detecting device including:

a coil group including three or more coils that includes a wound wire having first and second terminals, the three or more coils including first and second coils which are adjacent to each other, a winding direction of the first coil from the first terminal to the second terminal being the same as a winding direction of the second coil from the first terminal to the second terminal;

a foreign object detecting circuit operative to:

select the first and second coils which are adjacent to each other from the coil group;

output a first detecting signal having a first predetermined waveform to the first terminal of the first coil and output a second detecting signal having a second predetermined waveform to the first terminal of the second coil to cause a first magnetic field generated from the first coil and a second magnetic field generated from the second coil to repel each other between the first and second coils, a polarity of the second predetermined waveform being the same as a polarity of the first predetermined waveform;

measure an amount of an impedance value with respect to one of the first and second coils which is caused by the presence of a foreign object; and determine that a foreign object above the first coil or the second coil is present if the amount of change exceeds a predetermined value, wherein potential of each of the second terminals of the first and second coils is at the same potential as reference potential of the foreign object detecting circuit.

The foreign object detecting device may include at least one switch that electrically connects the first and second coils to the foreign object detecting circuit.

According to the above-described aspect, the first and second coils which are adjacent to each other are selected from the coil group including three or more coils. Since the detection of foreign objects can be performed at desired positions of the coil group, it is possible to determine the presence or the absence of foreign objects in a wide range.

[Item 13]

The foreign object detecting device according to item 12, wherein:

the first terminal of each of the first and second coils is one of an outer terminal disposed on an outer side of a corresponding one of the first and second coils and an inner terminal disposed on an inner side of a corresponding one of the first and second coils; and the second terminal of each of the first and second coils is the other one of the outer terminal and the inner terminal of a corresponding one of the first and second coils.

[Item 14]

The foreign object detecting device according to item 12, wherein the foreign object detecting circuit simultaneously outputs the first and second detecting signals to the first and second coils, respectively.

According to the above-described aspect, since there is no phase difference between the first and second detecting signals, the distributions of magnetic fields generated from the first and second coils become uniform, thereby making it possible to detect foreign objects with high precision.

[Item 15]

A wireless power transmitting apparatus including:

the foreign object detecting device according to item 12 or 13;

a power transmitting coil; and a power transmitting circuit that transmits high-frequency power to the power transmitting coil.

According to the above-described aspect, the wireless power transmitting apparatus includes the foreign object detecting device according to an embodiment of the present disclosure that is able to increase the range in which foreign objects can be detected with high precision. It is thus possible to increase the range in which the power transmitting circuit is able to transmit high-frequency power.

Additionally, if the first and second coils and the power transmitting coil are different coils, the detection of the entry of foreign objects can be performed even while high-frequency power is being transmitted. It is thus possible to prevent the danger that heat generation will occur due to the presence of foreign objects.

[Item 16]

The wireless power transmitting apparatus according to item 15, further including:

a housing within which the power transmitting coil is disposed, wherein an outer periphery of each of the first and second coils is smaller than an outer periphery of the power transmitting coil, and the first and second coils are disposed between a main surface of the housing and the power transmitting coil.

According to the above-described aspect, since the outer periphery of each of the first and second coils is smaller than that of the power transmitting coil, it is possible to detect foreign objects smaller than the power transmitting coil.

[Item 17]

The wireless power transmitting apparatus according to item 15, wherein the power transmitting coil and at least one of the first and second coils are the same component.

According to the above-described aspect, it is possible to reduce the cost and also to decrease the weight and the thickness of the wireless power transmitting apparatus.

[Item 18]

The wireless power transmitting apparatus according to one of items 15 to 17, wherein power of the first detecting signal and power of the second detecting signal are lower than the high-frequency power.

[Item 19]

The wireless power transmitting apparatus according to one of items 15 to 18, further including:

a control circuit that causes the power transmitting circuit to transmit the high-frequency power after it is determined by the foreign object detecting circuit that there is no foreign object above the first coil or the second coil.

According to the above-described aspect, after it is determined by the foreign object detecting circuit that there is no foreign object within a magnetic field formed by the first and second coils, the power transmitting circuit is caused to transmit high-frequency power, thereby enhancing the safety.

[Item 20]

A wireless power transfer system including:

the wireless power transmitting apparatus according to one of items 15 to 19; and a wireless power receiving apparatus.

[Item 21]

A foreign object detecting device including:

a first coil on which a wire is wound;

a second coil on which a wire is wound and that is disposed adjacent to the first coil; and a foreign object detecting circuit operative to:

output a first detecting signal having a first predetermined waveform to the first coil and a second detecting signal having a second predetermined waveform to the second coil to cause both of a current based on the first detecting signal flowing through the first coil and a current based on the second detecting signal flowing through the second coil to flow clockwise or counterclockwise so that a first magnetic field generated from the first coil and a second magnetic field generated from the second coil repel each other, the repelled first and the second magnetic field being disposed between the first and second coils;

measure an amount of an impedance value with respect to one of the first and second coils which is caused by the presence of a foreign object; and determine that a foreign object above the first coil or the second coil is present if the amount of change exceeds a predetermined value.

With this configuration, not only the range in which foreign objects can be detected is increased by disposing multiple coils, but also a foreign object above a first coil or a second coil can be detected with high precision by intensifying the magnetic field above the first and second coils.

As a result, it is possible to increase the range (in particular, the range in the height direction) in which foreign objects can be detected with high precision.

Additionally, general-purpose detecting coils may be safely used, thereby suppressing an increase in the number of components, dimensions, and manufacturing cost of the foreign object detecting device.

A foreign object detecting device, a wireless power transmitting apparatus, and a wireless power transfer system according to an embodiment of the present disclosure are suitably used for detecting foreign objects near a power transmitting coil or a power receiving coil when wirelessly transmitting power to a power receiving apparatus, such as a mobile device and an electric vehicle (EV).

What is claimed is:

1. A foreign object detecting device, comprising:

a first coil that includes a first wound wire having first and second terminals;

a second coil that includes a second wound wire having third and fourth terminals and is disposed adjacent to the first coil, a winding direction of the second wound wire from the third terminal to the fourth terminal being the same as a winding direction of the first wound wire from the first terminal to the second terminal; and one foreign object detecting circuit operative to output first detecting signal having a first predetermined waveform to the first terminal of the first coil and output a second detecting signal having a second predetermined waveform to the third terminal of the second coil to cause a first magnetic field generated from the first coil and a second magnetic field generated from the second coil to repel each other, a polarity of the second predetermined waveform being the same as a polarity of the first predetermined waveform, the repelled first and the second magnetic field being disposed between the first and second coils;

measure an amount of change of an impedance value with respect to one of the first and second coils which is caused by the presence of a foreign object;

determine that a foreign object above, but not in contact with, the first coil or the second coil is present if the amount of change of the impedance value caused by the foreign object changing a combined first magnetic field and second magnetic field exceeds a predetermined value;

determine that the foreign object above, but not in contact with, the first coil or the second coil is not present when the amount of change of the impedance value caused by the foreign object changing a combined first magnetic and second magnetic field does not exceed the predetermined value; and output a signal when a determination is made that the foreign object is not present, wherein determining whether a foreign object is present continues until the determination is made that a foreign object is not present, wherein potential of each of the second and fourth terminals is at the same potential as reference potential of the foreign object detecting circuit.

2. The foreign object detecting device according to claim 1, wherein each of the first and third terminals is one of an outer terminal disposed on an outer side of a corresponding one of the first and second coils and an inner terminal disposed on an inner side of a corresponding one of the first and second coils; and each of the second and fourth terminals is the other one of the outer terminal and the inner terminal of a corresponding one of the first and second coils.

3. The foreign object detecting device according to claim 1, wherein each of the first and second coils is disposed in a direction perpendicular to an axis of a corresponding one of the first and second coils.

4. The foreign object detecting device according to claim 1, wherein the first and second detecting signals are alternating current signals or pulse signals.

5. The foreign object detecting device according to claim 1,
wherein the foreign object detecting circuit simultaneously outputs the first and second detecting signals to the first and second coils, respectively.

6. A wireless power transmitting apparatus comprising:
the foreign object detecting device according to claim 1;
a power transmitting coil; and
a power transmitting circuit that transmits high-frequency power to the power transmitting coil.

7. The wireless power transmitting apparatus according to claim 6, further comprising:
a housing within which the power transmitting coil is disposed,
wherein an outer periphery of each of the first and second coils is smaller than an outer periphery of the power transmitting coil, and
the first and second coils are disposed between a main surface of the housing and the power transmitting coil.

8. The wireless power transmitting apparatus according to claim 6,
wherein the power transmitting coil and at least one of the first and second coils are the same component.

9. The wireless power transmitting apparatus according to claim 6,
wherein power of the first detecting signal and power of the second detecting signal are lower than the high-frequency power.

10. The wireless power transmitting apparatus according to claim 6, further comprising:
a control circuit that causes the power transmitting circuit to transmit the high-frequency power after it is determined by the foreign object detecting circuit that there is no foreign object above the first coil or the second coil.

11. A wireless power transfer system, comprising:
the wireless power transmitting apparatus according to claim 6; and
a wireless power receiving apparatus.

12. A foreign object detecting device, comprising:
a coil group including three or more coils that includes a wound wire having first and second terminals, the three or more coils including first and second coils which are adjacent to each other, a winding direction of the first coil from the first terminal to the second terminal being the same as a winding direction of the second coil from the first terminal to the second terminal; and
a foreign object detecting circuit operative to
select the first and second coils which are adjacent to each other from the coil group;
output a first detecting signal having a first predetermined waveform to the first terminal of the first coil and a second detecting signal having a second predetermined waveform to the first terminal of the second coil to cause a first magnetic field generated from the first coil and a second magnetic field generated from the second coil to repel each other between the first and second coils, a polarity of the second predetermined waveform being the same as a polarity of the first predetermined waveform;
measure an amount of an impedance value with respect to one of the first and second coils which is caused by the presence of a foreign object; and
determine that a foreign object above, but not in contact with, the first coil or the second coil is present when the amount of change of the impedance value caused by the foreign object changing a combined first magnetic field and second magnetic field exceeds a predetermined value;
determine that the foreign object above, but not in contact with, the first coil or the second coil is not present when the amount of change of the impedance value caused by the foreign object changing a combined first magnetic field and second magnetic field does not exceed the predetermined value; and
output a signal when a determination is made that the foreign object is not present, wherein determining whether a foreign object is present continues until the determination is made that a foreign object is not present,
wherein potential of each of the second terminals of the first and second coils is at the same potential as reference potential of the foreign object detecting circuit.

13. The foreign object detecting device according to claim 12,
wherein the first terminal of each of the first and second coils is one of an outer terminal disposed on an outer side of a corresponding one of the first and second coils and an inner terminal disposed on an inner side of a corresponding one of the first and second coils; and
the second terminal of each of the first and second coils is the other one of the outer terminal and the inner terminal of a corresponding one of the first and second coils.

14. The foreign object detecting device according to claim 12,
wherein the foreign object detecting circuit simultaneously outputs the first and second detecting signals to the first and second coils, respectively.

15. A wireless power transmitting apparatus, comprising:
the foreign object detecting device according to claim 12;
a power transmitting coil; and
a power transmitting circuit that transmits high-frequency power to the power transmitting coil.

16. The wireless power transmitting apparatus according to claim 15, further comprising:
a housing within which the power transmitting coil is disposed,
wherein an outer periphery of each of the first and second coils is smaller than an outer periphery of the power transmitting coil, and
the first and second coils are disposed between a main surface of the housing and the power transmitting coil.

17. The wireless power transmitting apparatus according to claim 15,
wherein the power transmitting coil and at least one of the first and second coils are the same component.

18. The wireless power transmitting apparatus according to claim 15,
wherein power of the first detecting signal and power of the second detecting signal are lower than the high-frequency power.

19. The wireless power transmitting apparatus according to claim 15, further comprising:
a control circuit that causes the power transmitting circuit to transmit the high-frequency power after it is determined by the foreign object detecting circuit that there is no foreign object above the first coil or the second coil.

20. A foreign object detecting device, comprising:
a first coil on which a wire is wound;
a second coil on which a wire is wound and that is disposed adjacent to the first coil; and
a foreign object detecting circuit operative to
   output a first detecting signal having a first predetermined waveform to the first coil and a second detecting signal having a second predetermined waveform to the second coil to cause both of a current based on the first detecting signal flowing through the first coil and a current based on the second detecting signal flowing through the second coil to flow clockwise or counterclockwise so that a first magnetic field generated from the first coil and a second magnetic field generated from the second coil repel each other, a polarity of the second predetermined waveform being the same as a polarity of the first predetermined waveform, the repelled first and the second magnetic field being disposed between the first and second coils;
   measure an amount of an impedance value with respect to one of the first and second coils which is caused by the presence of a foreign object;
   determine that a foreign object above, but not in contact with, the first coil or the second coil is present when the amount of change of the impedance value caused by the foreign object changing a combined first magnetic field and second magnetic field exceeds a predetermined value;
   determine that the foreign object above, but not in contact with, the first coil or the second coil is not present when the amount of change of the impedance value caused by the foreign object changing a combined first magnetic field and second magnetic field does not exceed the predetermined value; and
   output a signal when a determination is made that the foreign object is not present, wherein determining whether a foreign object is present continues until the determination is made that a foreign object is not present.

* * * * *